US008599857B2

(12) United States Patent
Waytena, Jr. et al.

(10) Patent No.: US 8,599,857 B2
(45) Date of Patent: Dec. 3, 2013

(54) TELECOMMUNICATION SERVICE EMPLOYING AN ELECTRONIC INFORMATION REPOSITORY STORING SOCIAL NETWORK USER INFORMATION, DEVELOPER INFORMATION, AND MOBILE NETWORK OPERATOR INFORMATION

(75) Inventors: William L. Waytena, Jr., San Francisco, CA (US); Eric T. Stone, San Francisco, CA (US)

(73) Assignee: Telesocial, Inc., San Francisco, CA (US)

( * ) Notice: Subject to any disclaimer, the term of this patent is extended or adjusted under 35 U.S.C. 154(b) by 308 days.

(21) Appl. No.: 12/884,804

(22) Filed: Sep. 17, 2010

(65) Prior Publication Data

US 2011/0069661 A1    Mar. 24, 2011

Related U.S. Application Data

(60) Provisional application No. 61/243,562, filed on Sep. 18, 2009, provisional application No. 61/358,690, filed on Jun. 25, 2010.

(51) Int. Cl.
*H04L 12/28* (2006.01)

(52) U.S. Cl.
USPC ..................................................... 370/395.2

(58) Field of Classification Search
None
See application file for complete search history.

(56) References Cited

U.S. PATENT DOCUMENTS

| | | | |
|---|---|---|---|
| 6,968,050 B1 | 11/2005 | Pershan et al. | |
| 8,218,744 B2 * | 7/2012 | Belz et al. | 379/142.04 |
| 8,295,820 B2 * | 10/2012 | Gottfried | 455/415 |
| 2003/0125997 A1 * | 7/2003 | Stoltz | 705/7 |
| 2004/0205200 A1 | 10/2004 | Kothari et al. | |
| 2006/0167890 A1 | 7/2006 | Miller et al. | |
| 2006/0268904 A1 | 11/2006 | Bae et al. | |
| 2007/0208845 A1 | 9/2007 | Raheman et al. | |
| 2007/0220092 A1 | 9/2007 | Heitzeberg et al. | |
| 2008/0005127 A1 * | 1/2008 | Schneider | 707/10 |
| 2008/0056235 A1 | 3/2008 | Albina et al. | |
| 2008/0084982 A1 | 4/2008 | Chatterjee | |
| 2008/0243853 A1 * | 10/2008 | Reding et al. | 707/9 |
| 2008/0276319 A1 * | 11/2008 | Rittermann | 726/23 |
| 2008/0280616 A1 | 11/2008 | Xu et al. | |
| 2008/0299953 A1 * | 12/2008 | Rao | 455/414.1 |
| 2009/0092237 A1 * | 4/2009 | Chang et al. | 379/93.25 |
| 2009/0185527 A1 | 7/2009 | Akhtar et al. | |
| 2009/0204598 A1 * | 8/2009 | Crane et al. | 707/5 |
| 2010/0017474 A1 * | 1/2010 | Kandekar et al. | 709/205 |
| 2010/0064007 A1 * | 3/2010 | Randall | 709/204 |

OTHER PUBLICATIONS

Eagle XG Enum Server, Product Brief, TEKELEC, 2009.
GSM Mobile Terminating Call Flow (GSM Mobile Terminated Call), EventHelix.com/Event Studio 2.5, Aug. 31, 2004.
GSM Traffic Management Training Document, Nokia Networks Oy, Jan. 2002.
Nortel Communication Server 2000, Product Brief, Nortel, 2009.
Tutorial on Signaling System 7 (SS7), Performance Technologies, 2000-2003.
3rd Generation Partnership Project; Technical Specification Group Core Network and Terminals; Line Identification Supplementary Services; Stage 2 (Release 8), 2008.

* cited by examiner

*Primary Examiner* — Otis L Thompson, Jr.
(74) *Attorney, Agent, or Firm* — Gordon & Jacobson, PC

(57) ABSTRACT

A telecommunication system that carries out telecommunication functions between multiple parties as initiated by the user interaction with a social network application, while maintaining privacy of the device identifiers (phone numbers or static IP addresses assigned to devices) of the participating parties.

77 Claims, 16 Drawing Sheets

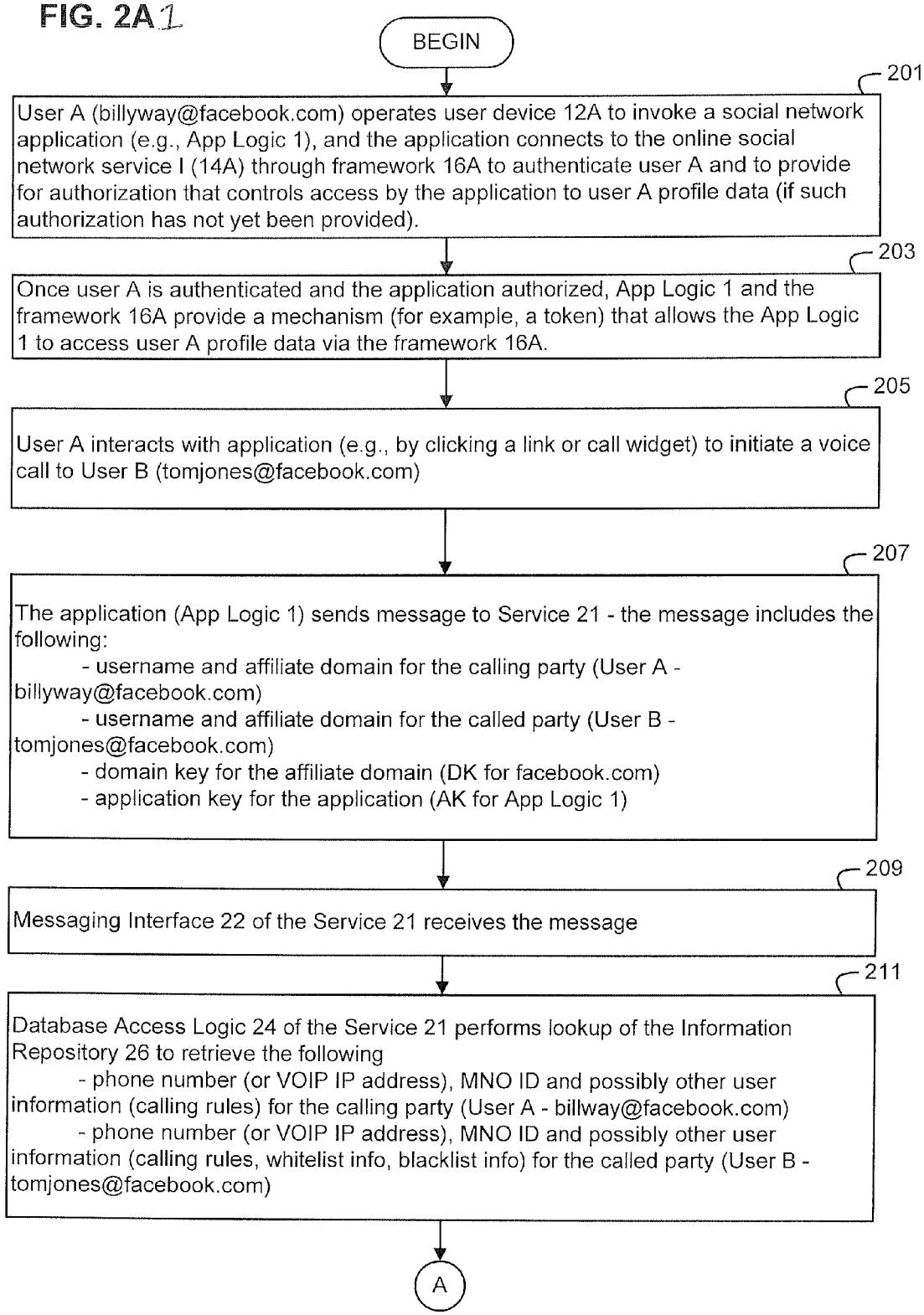

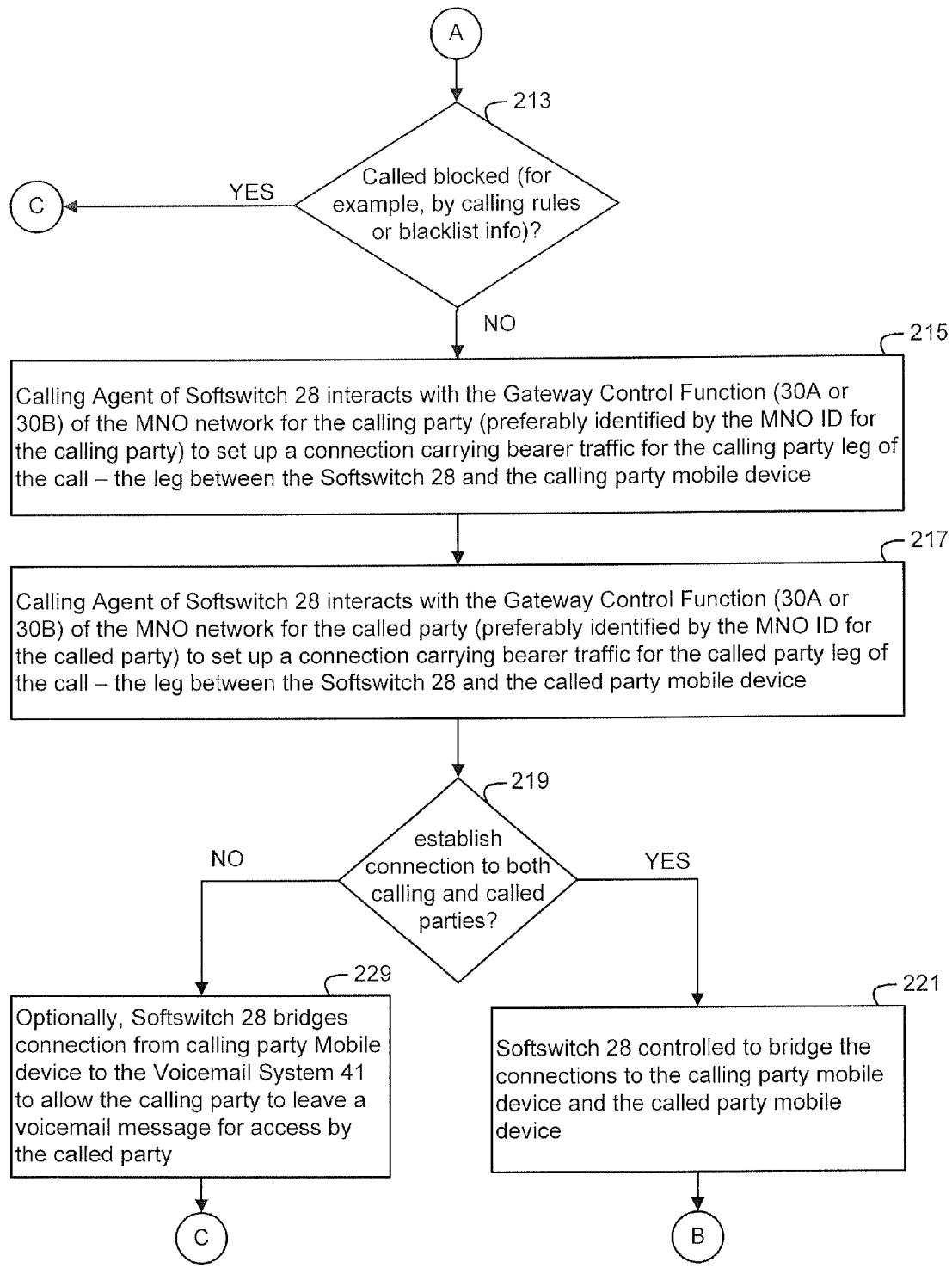
FIG. 2A2

FIG. 2A3
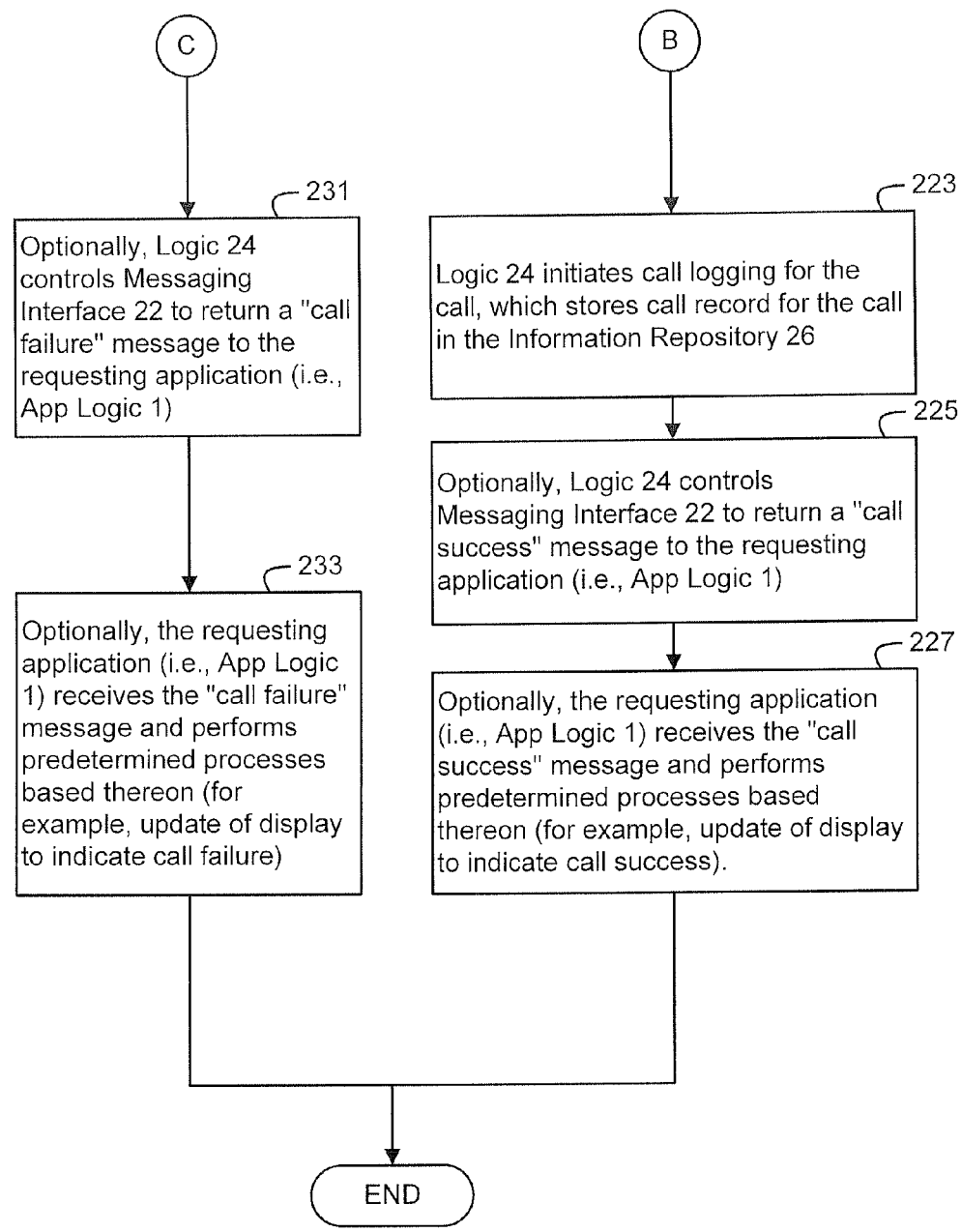

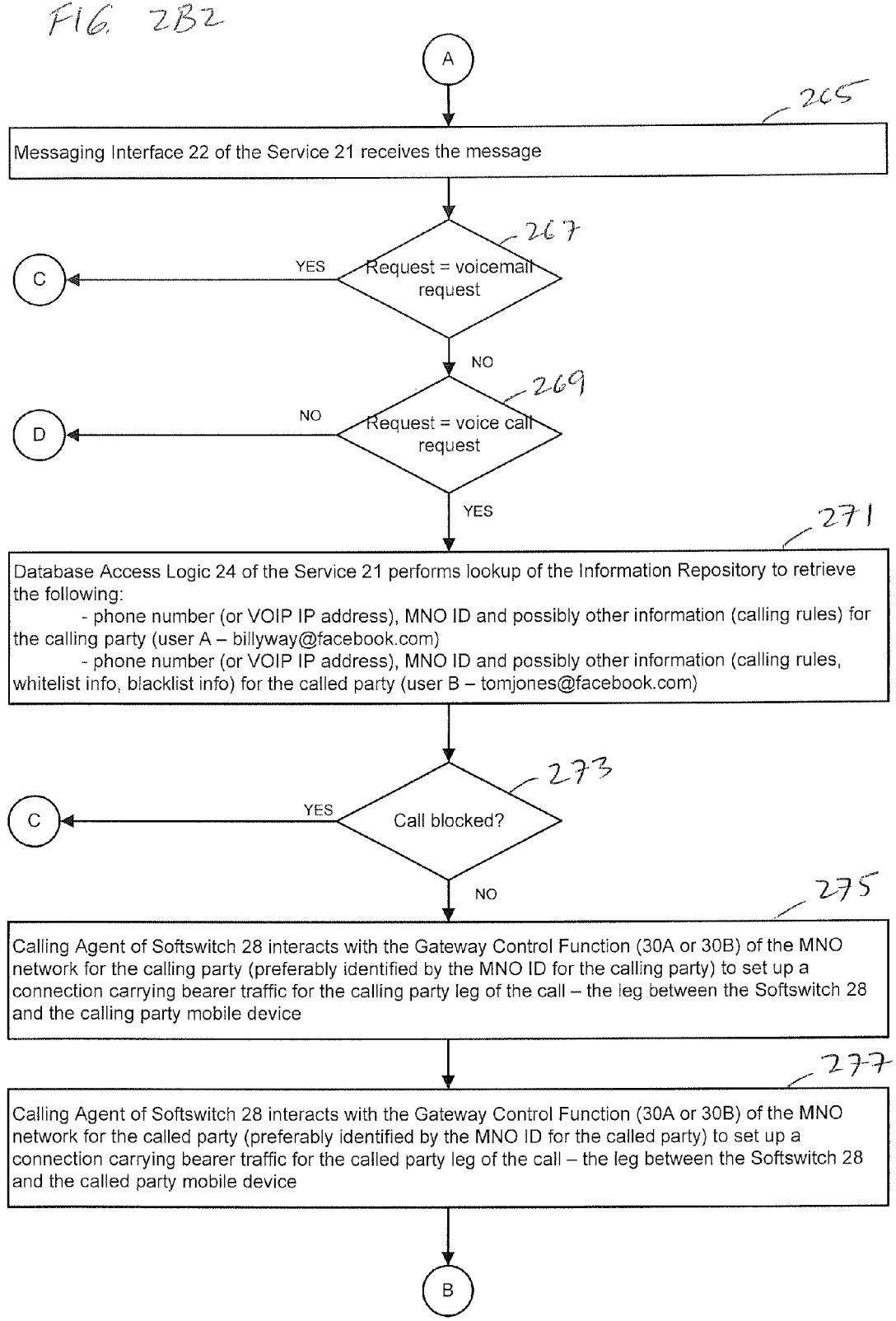

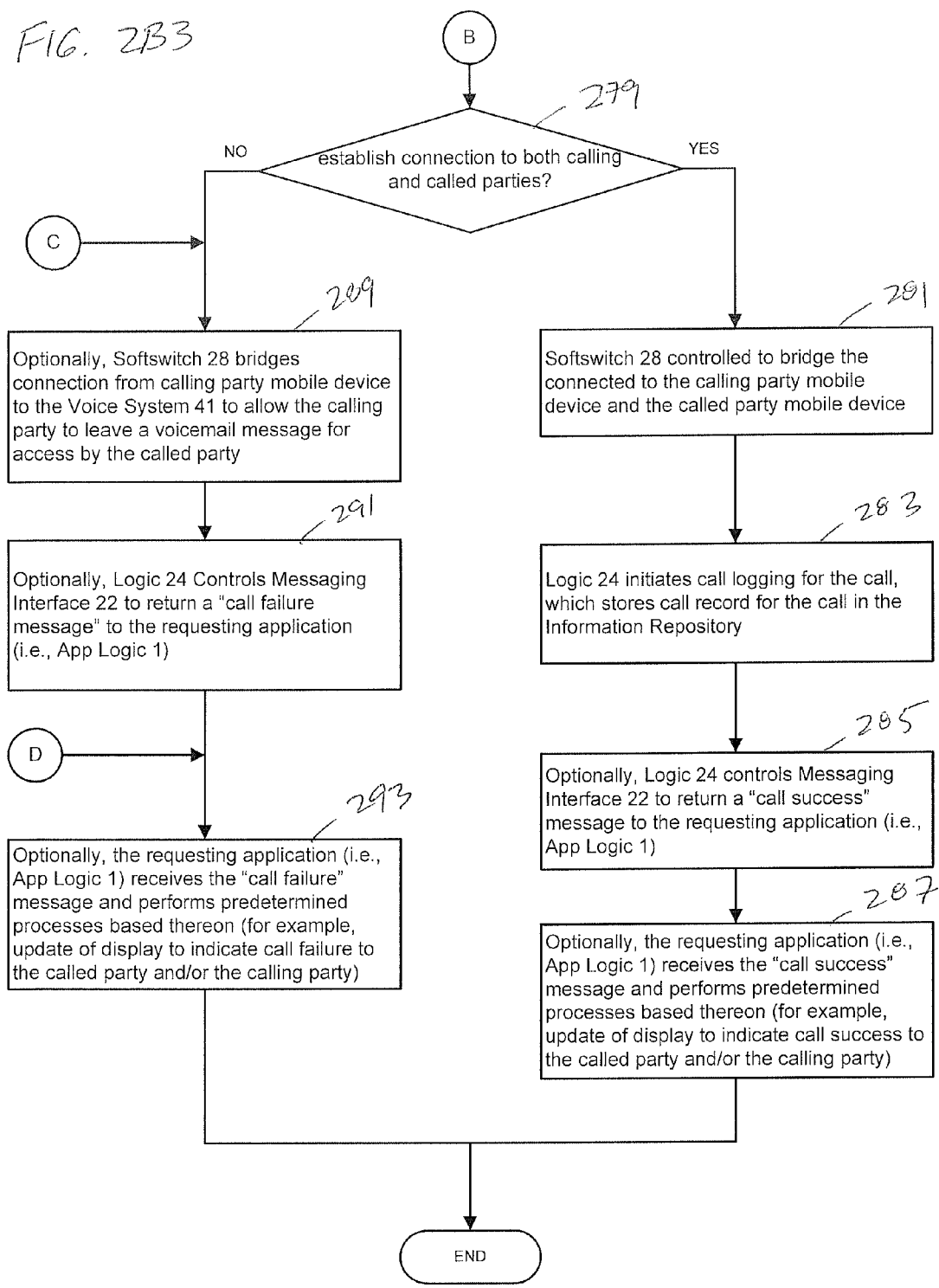

FIG. 3

| INFORMATION REPOSITORY 26 | | |
|---|---|---|
| SN User Information (for each SN User) 26A | Developer Information (for a given Application Developer) 26B | MNO Information (for each MNO) 26C |
| - SN user ID (e.g., billyway)<br>- SN domain (e.g., facebook.com)<br>- phone number (or IP address) for user mobile device<br>- MNO ID for the user mobile device<br>- global activation parameter (ON/OFF) for the user mobile device (for all SN applications)<br>- global usage parameters (such as global blacklists or whitelists)<br>- for each registered SN application,<br>  -- app ID of the SN application<br>  -- user alias name for the SN application (if applicable)<br>  -- application-specific activation parameter (ON/OFF) for the user mobile device<br>  -- application-specific usage parameters (such as blacklists or whitelists)<br>- view of call record information for the SN user<br>  for calls originated by the SN user<br>    -- start time, elapsed time, MNO ID for the user (calling party), called party user alias name for the requesting application (or SN user name and SN domain for the called party), and application ID for the requesting application<br>  for calls received by the SN user<br>    -- start time, elapsed time, MNO ID for the user (called party), calling party user alias name for the requesting application (or SN user name and SN domain for the calling party), and application ID for the requesting application | - for each application developed by the given application developer<br>  -- AK for the application<br>  -- app ID for the application<br>  -- social network domain(s) connected to by the application (e.g., facebook.com)<br>  -- DK for the social network domain(s) connected to by the application<br>  -- view of call record information requested by the application (i.e., start time, elapsed time, SN user ids (or alias names) for the parties of the call, and the app ID for the requesting application; it can also include summary information based therefrom | - gateway information (for provisioning connections to the MNO<br>- view of call record information for calls services by the MNO (i.e., start time, elapsed time, phone number (or IP address) for the user mobile device that is terminated by the MNO for the call, and the app ID for the requesting application; it cal also include summary information derived therefrom |

For each call
- start time, elapsed time, SN user ID and SN domain (and alias name, if any) for the calling party, the phone numbers (or IP addresses) for the user mobile device that terminates each call leg, and the AK (or app ID) for the requesting application. Other information can be included, such as phone number charged for the call, a sequence number identifying the record, additional digits on the called number(s) used to route or charged the call, the result of the call (whether it was answered, busy, connected to voicemail, etc.), the route for each call leg, and any fault condition encountered Call Records 26D Calling Party Call-Setup Loop Called Party Call-Set-up Loop

TELECOMMUNICATION SERVICE EMPLOYING AN ELECTRONIC INFORMATION REPOSITORY STORING SOCIAL NETWORK USER INFORMATION, DEVELOPER INFORMATION, AND MOBILE NETWORK OPERATOR INFORMATION

CROSS-REFERENCE TO RELATED APPLICATIONS

This application claims benefits from U.S. Provisional Patent Application No. 61/243,562, filed Sep. 18, 2009 and U.S. Provisional Patent Application No. 61/358,690, filed Jun. 25, 2010, the contents of which are hereby incorporated herein by reference.

BACKGROUND OF THE INVENTION

1. Field of the Invention

This invention relates broadly to social network applications that are connected to online social networks. More particularly, this invention relates to providing advanced telecommunication services to users of such social network applications.

2. State of the Art

An online social network service is a web-based service that provides a means for users to interact over the Internet in order to build social networks and provide social interactions between such users. Online social networking services allow users to share ideas, activities, events, and interests within their individual networks. Popular online social network services in North America include Facebook, Bebo, Twitter, MySpace and LinkedIn. Other online social network services are popular for other geographic regions.

Some of the online social network services provide a framework that allows independent software developers (as well as developers of the service itself) to develop software logic (referred to herein as "social network applications") that is connected to the given service such that the application can access user profile data maintained by the service. The social network applications typically provide a means for users to interact over the Internet in order to carry out desired functionality. For example, Facebook employs a framework utilized by a large number of social network applications, including games (such as "FarmVille" by Zynga, "Texas HoldEm Poker" by Zynga, "Café World" by Zynga, "PetVille" by Zynga, "Mafia Wars" by Zynga, and "Treasure Island" by Zynga), media content sharing (such as "Mobile" by Facebook), dating services (such as "Zoosk" by Zoosk, Inc.) and others. The frameworks provide a mechanism for authenticating a particular user. The frameworks also provide a mechanism that allows individual users to authorize a particular social network application. Once a user is authenticated and the particular application authorized by the user, the application can access profile data of the user. Typically, a permissions scheme is implemented to provide a mechanism for granting access to certain types of user profile data. For example, Facebook employs a permissions scheme with a default state whereby the authorized application can access all of the public data in the user's profile, including name, profile picture, gender, and friend list. Access to certain types of private data is managed by extended permissions. For example, if an application seeks to incorporate a user's photos, the application, you would request the "user_photos" extended permission. A long list of extended permission types are described at http://developers.facebook.com/docs/authentication/permissions, herein incorporated by reference in its entirety. During the authorization process, the user is presented with a UI in which the user can authorize your application to access that specific part of her profile.

One of the problems that challenge user of online social networks as well as social network applications is the inherent inability of the current systems to provide for voice communication amongst users unless the users' phone numbers are known.

For example, the SkypeMe application has been developed that allows a SkypeMe/Facebook user to add specific Facebook friends to a list of SkypeMe/Facebook users and provides for voice and chat services to the list of SkypeMe/Facebook users on the Skype network. The services provided by the SkypeMe application are limited in nature as the voice calls and chat requires Skype-enabled end-point devices. Moreover, the SkypeMe services associates a Skype user ID (or online identifier) with a particular Facebook user ID. The Skype user ID identifies the Skype user and does not correspond to any particular end point device. Instead, the Skype user ID is used in conjunction with Skype software executing on any Skype-enabled end-point device to dynamically login to the Skype network to establish a connection between the Skype-enabled end-point device and the Skype network for communication to the Skype user. Finally, from the point of view of the SkypeMe/Facebook user, the SkypeMe service is limited to specific friends (i.e., only those in the users list of SkypeMe/Facebook users).

In another example, social network applications have been developed that include Call Me functionality that interface to the Google Voice platform. The Call Me functionality includes a call widget associated with a particular user. The call widget is made accessible to other users executing respective social network application. The other users can click the call widget and enter their respective phone number. The social network application communicates a message (POST/voice/call/connect) to the Google Voice platform that specifies the phone numbers for the parties of the call. The phone number for the calling party is the phone number entered by the user via interaction with the call widget. The phone number for the called party is the phone number of the particular user associated with the call widget. Importantly, the Call Me functionality of the social network application and the Google Voice platform requires that the parties expose their phone numbers for use by the social network applications. The core issue is that a user's phone number is private in nature and there are many instances where a user would like to maintain the privacy of his or her phone number. Such instances are commonplace in social network applications such as games and dating application where users have little personal knowledge of the other online users. Moreover, it can be cumbersome for the calling party to enter his or her phone number and user input errors can cause failures in properly setting up the call.

Similar problems exist for SMS messaging between users of online social networks and social network applications associated therewith social network users.

Thus, there remains a need for means of voice, SMS as well as other forms of communication amongst users of online social networks and social network applications associated therewith where a user can maintain the privacy of his or her phone number with respect to the social network application that is used to trigger the communication all as well as to the other parties of the communication.

SUMMARY OF THE INVENTION

In accord with one embodiment of the invention, a telecommunication service is provided that interfaces to social network applications to provide for mobile-based telecommunication services (e.g., mobile voice calls, SMS messaging and other forms of communication) amongst users of online social networks and social network applications, wherein the parties of the telecommunication services are identified to the telecommunication service by their respective user name, screen name, email address or other handle. Such handles are widely or publicly distributed, and thus more commonly used in online social networks and, more importantly, more anonymous to the identity of the individual user as compared to their telephone number.

In accord with an embodiment of the invention, the telecommunication service includes an information repository storing in electronic form social network user information including first data corresponding to a respective social network user. The first data includes a user identifier and at least one device identifier for the respective social network user. In the preferred embodiment, social network users interact with the service to register an association to a particular device identifier (e.g., mobile phone number) and store the registered device identifier as part of the first data maintained by the information repository. The registration process preferably involves verification of possession of the device identified by given device identifier by a communication loop between the telecommunication service and the given device.

The service also includes messaging means for receiving an electronic request issued in conjunction with user-execution of a given social network application. The electronic request is used to initiate a telecommunication function (e.g., voice call) involving a plurality of social network users identified by respective user identifiers included as part of the electronic request. Importantly, the electronic request omits any device identifiers for the plurality of social network users identified by respective user identifiers included as part of the electronic request. The service further includes database access means for retrieving from the information repository at least one device identifier corresponding to a respective user identifier included as part of the electronic request, and means for initiating the telecommunication function corresponding to the electronic request. The telecommunication function includes communication to at least one device for a respective social networking user, wherein the at least one device is identified by the corresponding device identifier as retrieved from the information repository.

In this manner, the service carries out the requested telecommunication function while maintaining the privacy of the device identifiers (phone numbers or static IP addresses assigned to devices) with respect to the parties as well as to the social network application that was used to initiate the function. This affords greater protection against unwanted distribution of the private phone numbers of the parties.

The information repository can be adapted to maintain useful information pertinent to both the application developers and the operator(s) servicing the calls initiated by the service as control access to such information so as to maintain privacy of the stored information.

Additional objects and advantages of the invention will become apparent to those skilled in the art upon reference to the detailed description taken in conjunction with the provided figures.

BRIEF DESCRIPTION OF THE DRAWINGS

FIGS. 2A1 through 2A3, collectively, is a flow chart illustrating exemplary operations of the elements of the system of FIG. 1 in servicing advanced telecommunication functions between users of the social network applications in accordance with a first embodiment of the present invention.

FIGS. 2B1 through 2B3, collectively, is a flow chart illustrating exemplary operations of the elements of the system of FIG. 1 in servicing advanced telecommunication functions between users of the social network applications in accordance with a second embodiment of the present invention.

FIG. 3 is a schematic illustration of the information stored in the ENUM database of the calling service of FIG. 1.

DETAILED DESCRIPTION OF THE PREFERRED EMBODIMENTS

Figure 1:
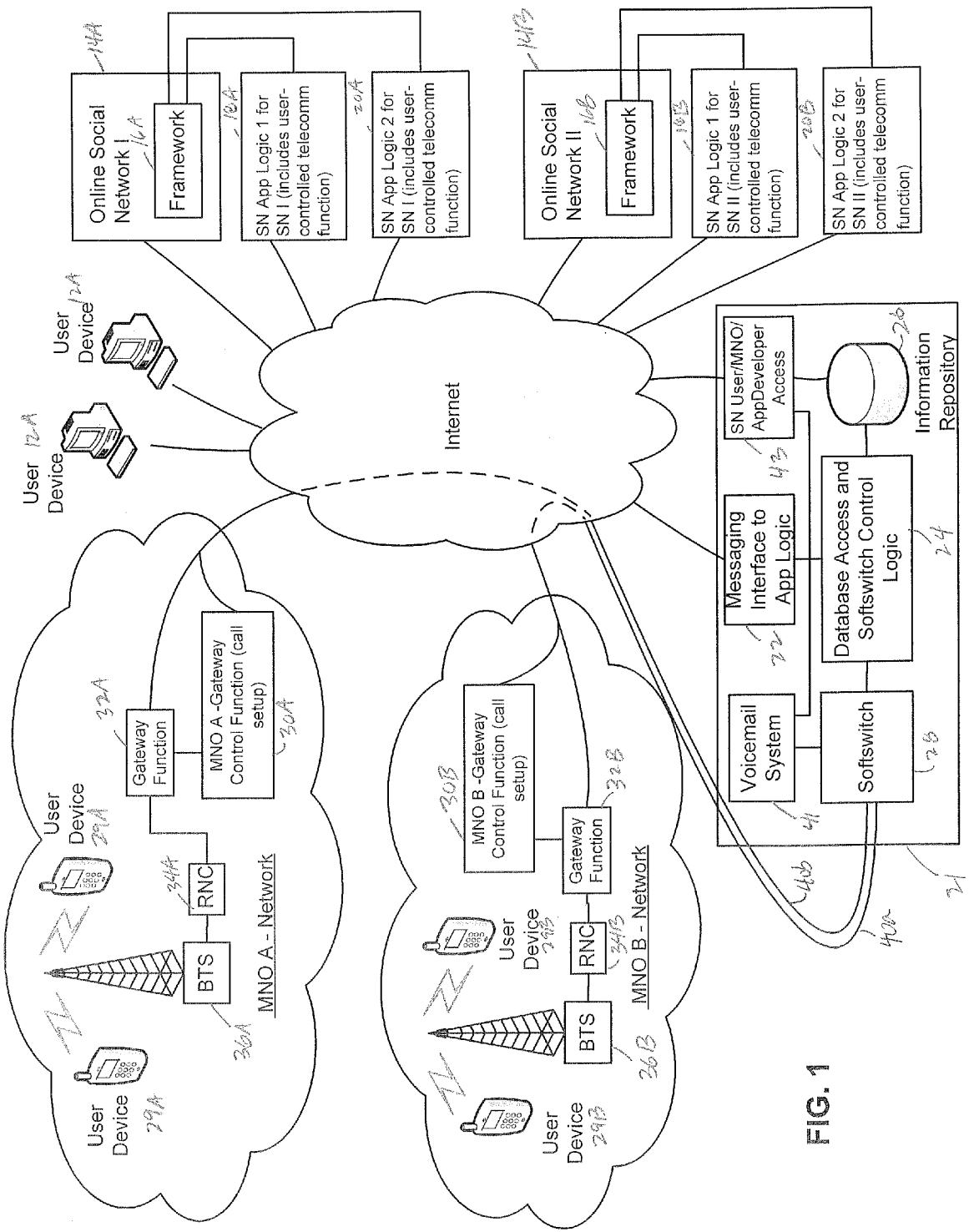
FIG. 1 is a system level block diagram of online social networks and social network applications together with a telecommunication system that interfaces thereto to provide for advanced telecommunication functions between users in accordance with the present invention.
Figure 23I:
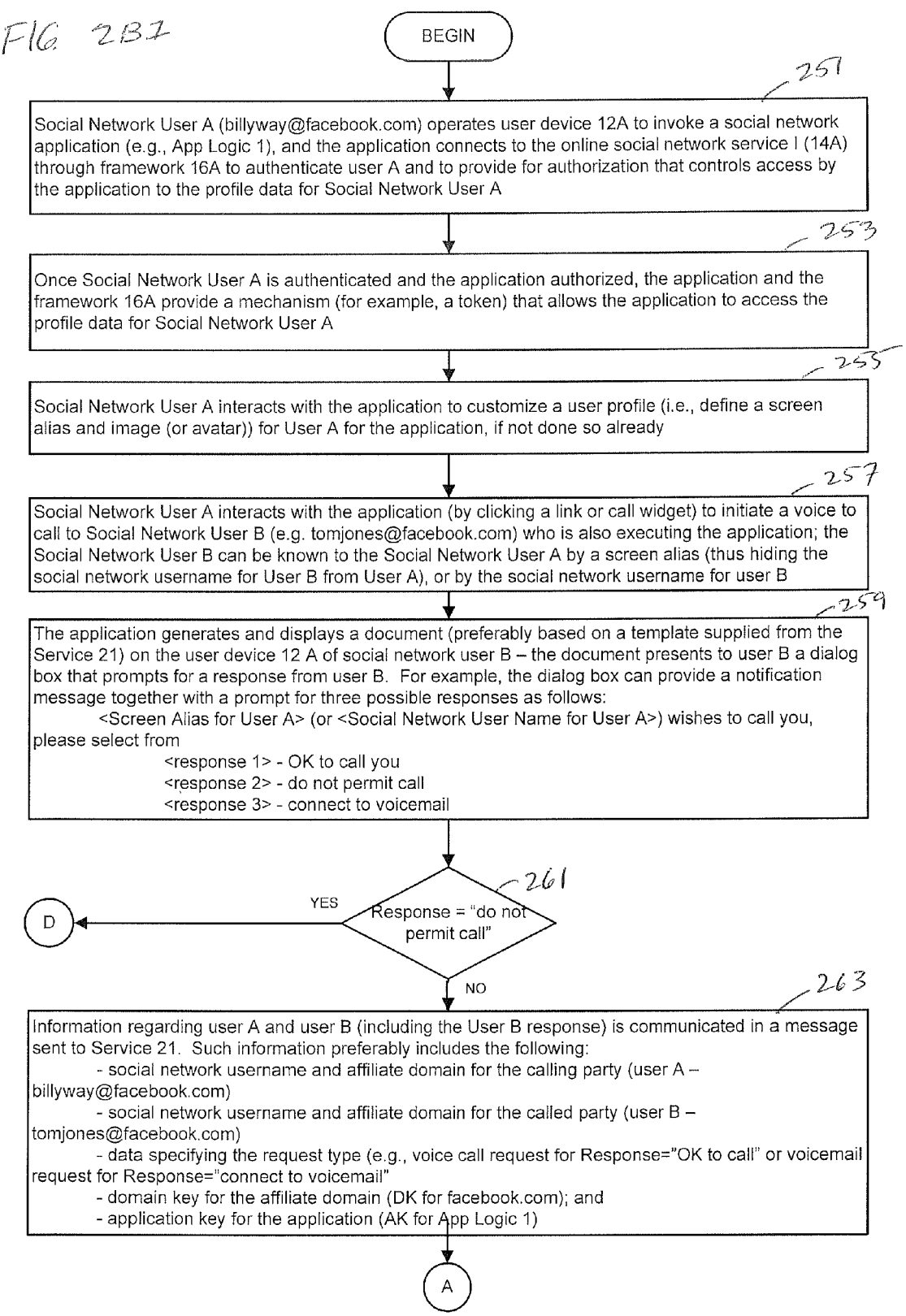

As used herein, a "key" is information (preferably a sequence of alphanumeric characters or hex string) of fixed length) that is assigned to an entity to authenticate data related to the entity.

As used herein, a "domain key" is a key that is assigned to a given social network service to authenticate data related to the given social network service.

As used herein, an "application key" is a key that is assigned to a given social network application to authenticate data related to the given social network application.

In accordance with the present invention, a telecommunication service is provided that includes an information repository storing in electronic form social network user information including first data corresponding to a respective social network user. The first data comprises a user identifier and at least one device identifier for the respective social network user. In the preferred embodiment, social network users interact with the service to register an association to a particular device identifier (e.g., mobile phone number) and store the registered device identifier as part of the first data maintained by the information repository. The registration process preferably involves verification of possession of the device identified by given device identifier by a communication loop between the telecommunication service and the given device.

The service also includes messaging means for receiving an electronic request issued in conjunction with user-execution of a given social network application. The electronic request is used to initiate a telecommunication function (e.g., voice call) involving a plurality of social network users identified by respective user identifiers included as part of the electronic request. Importantly, the electronic request omits any device identifiers for the plurality of social network users identified by respective user identifiers included as part of the electronic request. The service further includes database access means for retrieving from the information repository at least one device identifier corresponding to a respective user identifier included as part of the electronic request, and means for initiating the telecommunication function corresponding to the electronic request. The telecommunication function includes communication to at least one device for a respective social networking user, wherein the at least one device is identified by the corresponding device identifier as retrieved from the information repository.

In this manner, the service carries out the requested telecommunication function while maintaining the privacy of the device identifiers (phone numbers or static IP addresses assigned to devices) with respect to the parties as well as to the social network application that was used to initiate the function. By maintaining such privacy, the device identifiers (phone numbers) are hidden from (i.e., not presented to) the parties as well as to the social network application that was used to initiate the function. This affords greater protection against unwanted distribution of the private phone numbers of the parties.

The information repository can be adapted to maintain useful information pertinent to both the application developers and the operator(s) servicing the calls initiated by the service as control access to such information so as to maintain privacy of the stored information.

FIG. 1 illustrates an exemplary embodiment of a telecommunication service 21 in accordance with the present invention. The service 21 allows social network applications to invoke voice communication amongst users' mobile devices as part of the respective social network application. The service 21 interfaces to social network application logic (e.g., App Logic 18A) for servicing voice calls between application users as initiated by user interaction with the respective application. The calling service 21 can interface to multiple social network applications (e.g., App Logic 18A and 20A) that are connected to the same online social network 14A and/or can interface to multiple social network applications (e.g., SN App Logic 18A and 18B) that are connected to different online social networks (e.g., 14A and 14B) as shown. The service 21 is particular adapted to service voice calls through one or more mobile network operator (MNO) networks as shown in FIG. 1, but can readily be adapted to service voice calls through other operator networks such as LECs servicing POTS lines and VoIP service providers servicing VoIP telephony lines.

In a first embodiment of the present invention, the social network applications (e.g., App Logic 18A, 20A, 18B, 20B) and the service 21 cooperate to initiate and service a voice call between users as provided in the flow chart of FIGS. 2A1 through 2A3. The operations begin in block 201, where a user (user A) operates user device 12A and invokes a social network application (referred to as "App Logic 1" and labeled 18A) via the Internet. In response thereto, the social network application 18A connects to the online social network service I (14A) through framework 16A to authenticate the user A, e.g., a logon process for the service, for example, using the user name (billyway) and password (XXXX) assigned to user A. The framework 16A also provides for authorization that controls access by the social network application 18A to user A profile data (if such authorization has not yet been provided).

In block 203, once user A is authenticated and the application authorized, the social network application 18A and the framework 16A provide a mechanism (for example, a token) that allows the social network application 18A to access user A profile data via the framework 16A.

Similar operations are carried out by another user (user B—tomjones@facebook.com) to invoke and execute the social network application (referred to as "App Logic 1" and labeled 18A) via the Internet.

In block 205, during execution of the social network application 18A, the application 18A presents user A with a link (or widget or other user-interface element) that is adapted to initiate a voice call to user B upon user interaction with the element. User A then interacts with the element (for example, by clicking on the link) to initiate a voice call to user B, and the application 18A is notified of the request (for example, by an HTTP request). User A is thus designated the calling party and user B is designated the called party throughout. It is contemplated that the application-drive initiation of voice calls can be part of many different application scenarios. For example, during a game application, a user can encounter an avatar for one or more other active users. In this scenario, the game application can present a link (or widget or other user-interface element) that is adapted to initiate a voice call between the active users (i.e., between user A and user B). In other example, during a media sharing application, a user can share media with one or more other active users. In this scenario, the media sharing application can present a link (or widget or other user-interface element) that is adapted to initiate a voice call between the active users (i.e., between user A and user B). In yet another example, during a dating application, a user can view a profile of other users of the application. In this scenario, the dating application can present a link (or widget or other user-interface element) that is adapted to initiate a voice call between users (i.e., between user A and user B).

In response to the request initiated in block 205, the application 18A generates and sends a message to messaging interface 22 of the service 21 over a communication link therebetween (block 207). In the preferred embodiment, the message is carried over an IP packet-based communication network linking the application 18A and the calling service 21 including the Internet as shown. The message preferably conforms to the SOAP/XML protocol to allow for efficient exchange of the information within the message. Alternatively, the message can conform to a predetermined RESTful architecture. This message includes the following:

user name (billyway) and social network domain (facebook.com) for the calling party;
    user name (tomjones) and social network domain (facebook.com) for the calling party;
    a domain key for the corresponding social network domain (e.g., DK for facebook.com); and
    an application key for the requesting social network application (18A).

In block 209, the messaging interface 22 of the service 21 receives the message communicated from application 18A in block 207 and controls the logic block 24 to perform a lookup of the information repository 26 in block 211.

As shown in FIG. 3, the information repository 26 stores information in electronic form, the information pertaining to social network users of the service 21, social network application developers and the social network applications that interface to the service 21, and one or more MNOs that provide resources for connecting calls to the social network users of the service 21. The information repository 26 further stores electronic information pertaining to the calls carried out by operation of the service 21. Access to information repository 26 is controlled according to each of the three user types (type 1—social network users of the service, type 2—developer users associated with social network application developers that develop and/or maintain social network applications that interface to the service, and type 3—MNO users that are associated with MNOs that provide resources for connecting calls to social network users of the service).

For the type 1 social network users, a given social network user can access the information stored in the information repository 26 for the given social network user (examples of such information is outlined in column 26A of FIG. 3). Access to the information stored in the information repository 26 for the given social network user is blocked for all other social network users as well as all type 2 developer users and all type 3 MNO users.

For the type 2 developer users, a given developer user can access the information stored in the information repository 26 that pertains to applications developed and/or maintained by the application developer associated therewith (examples of such information is outlined in column 26B of FIG. 3). Access to the information stored in the information repository 26 that pertains to such applications is blocked for developer users associated with other application developers, for all type 1 social network users and for all type 3 MNO users.

For the type 3 MNO users, a given MNO user can access the information stored in the information repository 26 that pertains to the MNO associated therewith (examples of such information is outlined in column 26C of FIG. 3). Access to the information stored in the information repository 26 that pertains to the given MNO is blocked for MNO users associated with other MNOs, for all type 1 social network users, and for all type 2 developer users.

In the preferred embodiment, the information repository 26 is realized by an SQL database system. A type 1 user name is defined for each social network user of the service 21, a type 2 user group and name is defined for each application developer and associated developer user of the service 21, and a type 3 user group and name is defined for each MNO and associated MNO user group of the service 21.

The social network user information (26A) is realized by a set of tables and views associated with a particular social network user in the SQL database system. Permissions associated with such tables and views are defined that allow for selection and reading of data from such tables and views by the particular social network user while disallowing the selection and reading of data from such tables and views by all other type 1 social network users, by any type 2 developer user and by any type 3 MNO user.

The developer information (26B) is realized by a set of tables and views associated with application developed and/or maintained by a particular application developer in the SQL database system. Permissions associated with such tables and views are defined that allow for selection and reading of data from such tables and views by all type 2 developer users that belong to the group associated with the particular application developer while disallowing the selection and reading of data from such tables and views by all type 2 developer user that belongs to groups associated with other application developers, by any type 1 social network user and by any type 3 MNO user.

The MNO information (26C) is realized by a set of tables and views associated with a particular MNO in the SQL database system. Permissions associated with such tables and views are defined that allow for selection and reading of data from such tables and views by all type 3 MNO users that belong to the group associated with the particular MNO while disallowing the selection and reading of data from such tables and views by all type 3 MNO users that belong to groups associated with other MNOs, by any type 1 social network user and by any type 2 developer user.

The access logic 43 (which can be realized by an HTTP server or application server) provides for controlled access to SQL database system by social network users, developer users and MNO users via data exchange over the Internet. Access is controlled utilizing unique access keys that are assigned to the respective social network users, developer users and MNO users of the service 21. In the preferred embodiment, the access key for a given social network user is a user name and password associated with the given social network user, while the access key for each given developer user and MNO user is secret key assigned thereto. Alternatively, the access key for a given social network user can be tied into the authentication mechanism (e.g., an authentication token) for the social network to which the user belongs. The access logic 43 maps a request issued by a particular social network user (as identified by the corresponding access key assigned to the particular social network user) into one or more appropriate SQL statements by the particular social network user, queries the SQL database with such SQL statement(s), and returns the pertinent information retrieved from the SQL database system to the requesting social networking user. Similarly, the access logic 43 maps a request issued by a particular developer user (as identified by the corresponding access key assigned to the particular developer user) into one or more appropriate SQL statements by the particular developer user, queries the SQL database with such SQL statement(s), and returns the pertinent information retrieved from the SQL database system to the requesting developer user. Moreover, the access logic 43 maps a request issued by a particular MNO user (as identified by the corresponding access key assigned to the particular MNO user) into one or more appropriate SQL statements by the particular MNO user, queries the SQL database with such SQL statement(s), and returns the pertinent information retrieved from the SQL database system to the requesting MNO user. In this manner, access control for the three parts 26A, 26B, 26C is provided by the permissions defined for the SQL database. In alternate embodiments, separate SQL database systems can be used for each logical partition 26A, 26B, 26C of the information repository 26.

In block 211, the query of the information repository 26 retrieves the following:
   mobile device phone number, mobile carrier ID, and possibly other user information (for example, calling rules) for the calling party (billyway@facebook.com); and
   mobile device phone number, mobile carrier ID, and possibly other user information (for example, calling rules or blacklist parameters) for the called party (tomjones@facebook.com).

In block 213, logic block 24 determines whether the call should be blocked. For example, the calling rules or blacklist info of the called party as retrieved from the information repository 26 can dictate that the call should be blocked (or not). In yet another example, the calling rules of the calling party as retrieved from the information repository 26 can dictate that the call should be blocked (or not). In the event that logic block 24 determines that the call should be blocked, the processing continues to block 231. Otherwise, the processing continues to block 215.

Blocks 215 and 217 involves the control of the softswitch 28 that is part of the service 21. The softswitch 28 includes switching logic that is controlled by a calling agent. The switching logic includes resources that provide for bridging of connections that carry the bearer traffic for the legs of the call. The switching logic of the softswitch 28 can also include media gateway functionality, such as media conversion for different transmission and coding protocols. The calling agent of the softswitch 28 (under control of logic block 24) performs a provisioning loop (block 215 and 217) that initiates call set-up and signaling to the gateway function (e.g., 32A or 32B) of the MNO for each leg of the call in order to set-up a connection that carries the bearer traffic for each leg of the call. The calling agent can provide for translation of call setup and signaling messages (e.g., from SIP to H.323 and vice versa or between other signaling protocols) and thus bridge calls using incompatible protocols. The calling agent can also employ an E.164 ENUM query to translate the E.164 number of the calling party and/or called party (as provided by the lookup to information repository 26) to a corresponding SIP address or URL for call setup and signaling purposes, if need be.

In the preferred embodiment, the softswitch 28 operates in a proxy mode in which both the call setup and signaling messages as well as the bearer traffic for each leg of the call flow through the softswitch 28. This configuration establishes connections between users while keeping their phone numbers private. In this proxy mode, the softswitch 28 can exercise full control over the call and disconnect calls in progress if necessary. The call set-up and signaling messages communicated between the calling agent of the softswitch 28 and the call-setup-functions (30A, 30B) of the respective MNO networks are carried out of band and can be realized by IP signaling (such as SIP, MGCP or Megaco signaling), SS7 signaling, or other suitable signaling mechanisms. The bearer traffic communicated between the softswitch 28 and the MNO networks for the legs of the call is preferably carried by IP trunks or other suitable network links (labeled 40A and 40B in FIG. 1).

In the exemplary embodiment, in block 215 the calling agent of the softswitch 28 cooperates with the call-setup-function (30A or 30B) of the MNO network for the calling party (preferably identified by the MNO ID of the calling party as retrieved from the information repository 26) to set up a connection (i.e., communication session) that carries bearer traffic for the leg of the call to the mobile device (29A or 29B) of the calling party. At the MNO side, the call-setup-function (30A or 30B) of the respective MNO network interfaces to a Radio Network Controller (RNC 34A or 34B) to carry out signaling functions with the calling party mobile device. If the call is accepted on the calling party mobile device, the call-setup-function (30A or 30B) of the respective MNO network interfaces to the corresponding gateway function (32A or 32B) to allocate resources to provide bearer traffic to and from the calling party mobile device (via the Base Station (36A or 36B) and RNC (34A or 34B) coupled to the calling party mobile device) over the connection to the softswitch 28. Typically, the respective gateway function (32A and 32B) provides media mapping and/or transcoding functions between potentially dissimilar networks.

In this manner, the resources of the MNO network of the calling party provides for bi-directional exchange of bearer traffic between the calling party mobile device and the softswitch 28. In 3G CDMA architectures, the gateway function (32A or 32B) of the MNO network is carried out by the Media Gateway (MGW), and the gateway control function (30A, 30B) is carried out by the MSC Server. In IMS architectures, the gateway function (32A or 32B) of the MNO network is carried out by the IMS Media Gateway (IMS-MGW), and the gateway control function (30A, 30B) is carried out by call session control functions (e.g., I-CSCF, S-CSCF and P-SCSF) in conjunction with the Media Gateway Control Function (MGCF). IN LTE-SAE architectures, the RNC and gateway functions (34A/32A or 34B/32B) of the MNO network is carried out by the Gateway (GW), and the gateway control function (30A, 30B) is carried out by the mobility management entity (MME). Similar functional elements are used in other architectures.

In block 217, the calling agent of the softswitch 28 cooperates with the call-setup-function (30A or 30B) of the MNO network for the called party (preferably identified by the MNO ID of the called party as retrieved from the information repository database 26) to set up a connection (i.e., communication session) that carries bearer traffic for the leg of the call to the mobile device (29A or 29B) of the called party. At the MNO side, the call-setup-function (30A or 30B) of the respective MNO network interfaces to a RNC (34A or 34B) to carry out signaling functions with the called party mobile device. If the call is accepted on the called party mobile device, the call-setup-function (30A or 30B) of the respective MNO network interfaces to the corresponding gateway function (32A or 32B) to allocate resources to provide bearer traffic to and from the called party mobile device (via the Base Station (36A or 36B) and RNC (34A or 34B) coupled to the calling party mobile device) over the connection to the softswitch 28. Typically, the respective gateway function (32A and 32B) provides media mapping and/or transcoding functions between potentially dissimilar networks. In this manner, the resources of the MNO network for the called party provides for bi-directional exchange of bearer traffic between the called party mobile device and the softswitch 28.

Figure 4A:
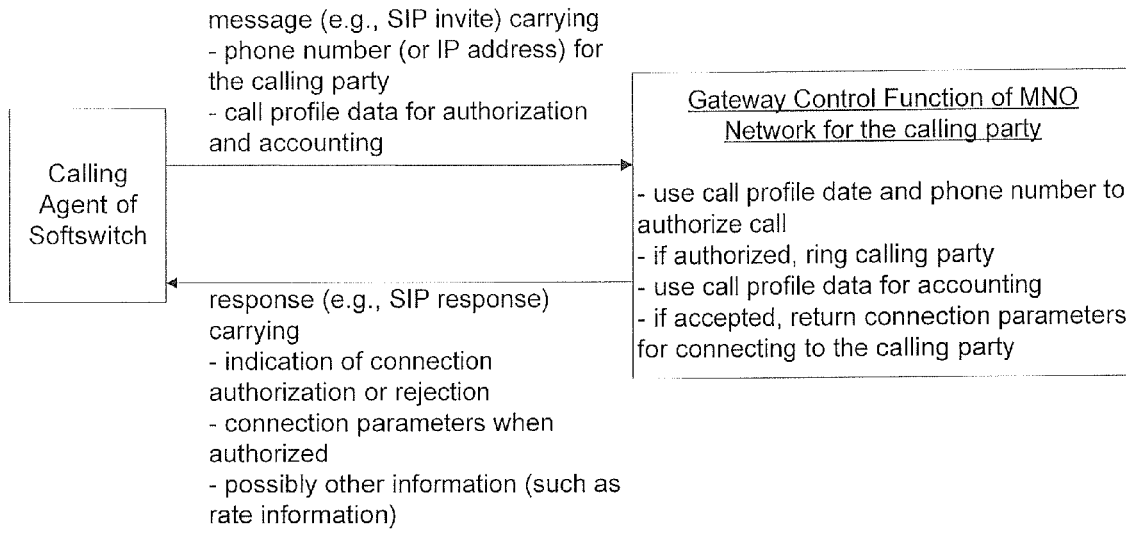
FIG. 4A is a schematic illustration of the calling party Call-Setup Loop performed as part of the operations of FIGS. 2A-2C.

As shown in detail in FIG. 4A, the calling party provisioning loop of block 215 involves the exchange of messages between the calling agent of the softswitch 28 and the call-setup-function (30A or 30B) of the respective MNO network for the calling party mobile device. Communication of such messages can be achieved by means of common protocols such Session Initiation Protocol (SIP) as shown. Other signaling protocols such as MGCP or Megaco and SS7 signaling can also be used. These messages include a provisioning request message (e.g., SIP request) communicated from the softswitch 28 to the call-setup-function (30A or 30B) that carries the mobile device phone number of the calling party and possibly call profile data. The call profile data can provide information related to the call that can be used for authorization and/or accounting purposes by the respective MNO. The call-setup-function (30A or 30B) of the MNO network utilizes the mobile device phone number and the call profile data to selectively authorize the call. The call profile data can be used for accounting purposes by the MNO as needed. The call-setup-function (30A or 30B) of the MNO network returns a response (e.g., SIP response) to the calling agent of the softswitch 28 that carries an indication of connection authorization (or rejection), connection parameters (when authorized) and possibly other information, such as rate information for the call.

Figure 4B:
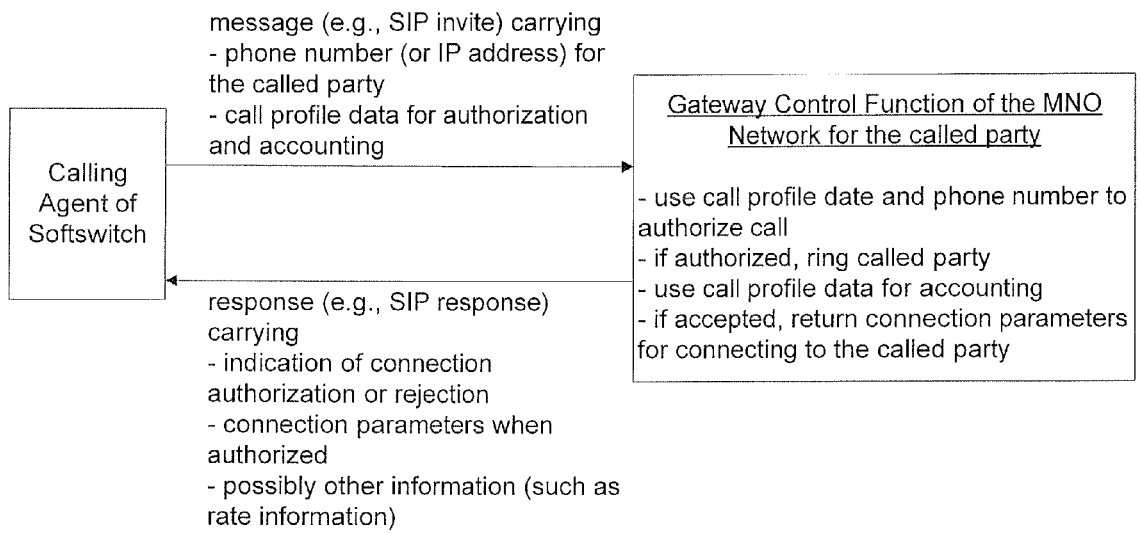
FIG. 4B is a schematic illustration of the called party Call-Setup Loop performed as part of the operations of FIGS. 2A-2C.

As shown in detail in FIG. 4B, the called party provisioning loop of block 217 involves the exchange of messages between the calling agent of the softswitch 28 and the call-setup-function (30A or 30B) of the respective MNO network of the called party mobile device. Communication of such messages can be achieved by means of common protocols such Session Initiation Protocol (SIP) as shown. Other signaling protocols such as MGCP or Megaco and SS7 signaling can also be used.

These messages include a provisioning request message (e.g., SIP request) communicated from the softswitch 28 to the call-setup-function (30A or 30B) that carries the mobile device phone number of the called party and possibly call profile data. The call profile data can provide information related to the call that can be used for authorization and/or accounting purposes by the respective MNO. The call-setup-function (30A or 30B) of the MNO utilizes the mobile device phone number and the call profile data to selectively authorize the call. The call profile data can be used for accounting purposes by the MNO as needed. The call-setup-function (30A or 30B) of the MNO network returns a response (e.g., SIP response) to the calling agent of the softswitch 28 that carries an indication of connection authorization (or rejection), connection parameters (when authorized) and possibly other information, such as rate information for the call.

In the exemplary embodiment shown in FIG. 4A, the call profile data communicated to the call-setup-function of the MNO network in the calling party provisioning loop of block 215 includes data identifying the social network application that initiated the call request message to the service (block 207) as well as the geographic location of the called party mobile device. In this example, the calling party user has a rate plan associated with calls initiated from a particular social network application (or group of social network applications). For example, the rate plan can provide for tiers of rates for minutes per billing period (e.g., $6 for the first 100 minutes and $0.20/minute thereafter for calls initiated from a particular social network application (or group of social network applications). The rate plan can also be limited to calls to endpoints located in limited geographical regions (for example, to mobile devices located only in the United States—National Calling only). In this case, the call-setup-function (30A or 30B) of the MNO network cooperates with the Home Subscriber Server (HSS), or other similar logic of the MNO network, to identify the pertinent calling party rate plan corresponding to the social network application as identified by the data supplied thereto, and utilizes the geographic location of the called party mobile device to authorize the call in the event that the called party mobile device is within the limited geographical area of the calling party rate plan (or reject the call in the event that the called party mobile device is outside the limited geographical area of the calling party rate plan). Moreover, the pertinent calling party rate plan corresponding to the request is used for accounting purposes for billing the call. In alternative embodiment, the call profile data communicated to the call-setup-function of the MNO network in the calling party provisioning loop of block 215 can include the mobile phone number of the called party mobile device for use in authorizing the call and billing. The MNO network can be adapted to hide the mobile phone number of called party mobile device as part of the information communicated to the calling party mobile device during call setup as well as on the billing statements of the calling party. The call-setup-function (30A or 30B) of the MNO network returns a response (e.g., SIP response) to the service softswitch 28 that carries an indication of connection authorization (or rejection), connection parameters (when authorized) and possibly other information, such as rate information for the call.

Similarly, in the exemplary embodiment shown in FIG. 4B, the call profile data communicated to the call-setup-function of the MNO network in the called party provisioning loop of block 217 includes data identifying the social network application that initiated the call request message to the service (block 207) as well as the geographic location of the calling party mobile device. In this example, the called party user has a rate plan associated with calls initiated from a particular social network application (or group of social network applications). For example, the rate plan can provide for tiers of rates for minutes per billing period for calls initiated from a particular social network application (or group of social network applications). The rate plan can also be limited to calls to endpoints located in limited geographical regions. In this case, the call-setup-function (30A or 30B) of the MNO network cooperates with the HSS (or other similar logic) of the MNO network to identify the pertinent called party rate plan corresponding to the social network application as identified by the data supplied thereto, and utilizes the geographic location of the calling party mobile device to authorize the call in the event that the calling party mobile device is within the limited geographical area of the called party rate plan (or reject the call in the event that the calling party mobile device is outside the limited geographical area of the called party rate plan). Moreover, the pertinent called party rate plan corresponding to the request is used for accounting purposes for billing the call. In alternative embodiment, the call profile data communicated to the call-setup-function of the MNO network in the called party provisioning loop of block 217 can include the mobile phone number of the called party mobile device for use in authorizing the call and billing. The MNO network can be adapted to hide the mobile phone number of calling party mobile device as part of the information communicated to the called party mobile device during call setup as well as on the billing statements of the called party. The call-setup-function (30A or 30B) of the MNO network returns a response (e.g., SIP response) to the service softswitch 28 that carries an indication of connection authorization (or rejection), connection parameters (when authorized) and possibly other information, such as rate information for the call.

In block 219, logic 24 evaluates the call connection status provided by the calling agent of softswitch 28 as a result of blocks 215 and 217 to determine whether a connection has been established to both the calling party user device and the called party user device. If so, the operations continue to blocks 221 to 227. Otherwise, the operation branches to blocks 229 to 233.

In block 221, softswitch 28 is controlled to bridge the connections to the calling party mobile device and the called party mobile device. Such bridging provides an end-to-end connection where the bearer traffic for each leg of the call flows through the softswitch 28. This configuration establishes connections between users while keeping their phone numbers private. In this mode, the softswitch 28 can exercise full control over the call and disconnect calls in progress if necessary.

In block 223, logic 24 initiates call logging for the call. In the preferred embodiment, such call logging operations stores a call record (26D) for the call in the information repository 26 (FIG. 3). The call record (26D) can include the start time, elapsed time, social network user id and domain for the called party, social network user id and domain for the calling party, the phone numbers (or static IP addresses) for the user mobile device that terminates each call leg, and the AK (or application ID) for the social network application that requested the call. Other information can be included such as phone number charged for the call, a sequence number identifying the record, additional digits on the called number used to route or charge the call, the result of the call (whether it was answered, busy etc), the route for each leg of the call, and any fault condition encountered.

In optional block 225, logic 24 control messaging interface 22 to return a "call success" message to the requesting application (i.e., App Logic 1).

In optional block 227, the requesting application (i.e., App Logic 1) receives the "call success" message and performs predetermined processes based thereon. For example, it is contemplated that the application can update the user display to provide an indication of call success.

In optional block 229, the softswitch 28 is controlled to bridge the connection from the calling party mobile device to the resources of the voicemail system 41 in order to allow the calling party to leave a voicemail message for access by the called party. In some circumstances (for example, where the called party answers and the calling party does not answer), softswitch 28 can be controlled to bridge the connection from the called party mobile device to the resources of the voicemail system 41 in order to allow the called party to leave a voicemail message for access by the calling party.

In optional block 231, logic 24 control messaging interface 22 to return a "call failure" message to the requesting application (i.e., App Logic 1).

In optional block 233, the requesting application (i.e., App Logic 1) receives the "call failure" message and performs predetermined processes based thereon. For example, it is contemplated that the application can update the user display to provide an indication of call failure.

In a second embodiment of the present invention, the social network applications (e.g., App Logic 18A, 20A, 18B, 20B) and the service 21 cooperate to initiate and service a voice call between users as provided in the flow chart of FIGS. 2B1 through 2B3. The operations begin in block 251, where a user (user A) operates user device 12A and invokes a social network application (referred to as "App Logic 1" and labeled 18A) via the Internet. In response thereto, the social network application 18A connects to the online social network service I (14A) through framework 16A to authenticate the user A, e.g., a logon process for the service, for example, using the user name (billyway) and password (XXXX) assigned to user A. The framework 16A also provides for authorization that controls access by the social network application 18A to user A profile data (if such authorization has not yet been provided).

In block 253, once user A is authenticated and the application authorized, the social network application 18A and the framework 16A provide a mechanism (for example, a token) that allows the social network application 18A to access user A profile data via the framework 16A.

In block 255, user A interacts with the social network application 18A to customize a user profile for the application. This involves defining a screen alias and possibly an image (or avatar) for user A that is communicated to other users during execution of the application. For example, during gaming applications, the screen alias and image (or avatar) can be displayed to identify the user A to other users of the game, and thus hide the social network user ID for user A from other users of the game.

Similar operations are carried out by another user (user B—tomjones@facebook.com) to invoke and execute the social network application (referred to as "App Logic 1" and labeled 18A) via the Internet.

In block 257, during execution of the social network application 18A, the application 18A presents user A with a link (or widget or other user-interface element) that is adapted to initiate a voice call to user B upon user interaction with the element. User B can be identified to user A by a screen alias associated thereto as described above, and thus hide the social network user ID for user B from user A. User A then interacts with the element (for example, by clicking on the link) to initiate a voice call to user B, and the application 18A is notified of the request (for example, by an HTTP request). User A is thus designated the calling party and user B is designated the called party throughout. It is contemplated that the application-drive initiation of voice calls can be part of many different application scenarios. For example, during a game application, a user can encounter an avatar for one or more other active users. In this scenario, the game application can present a link (or widget or other user-interface element) that is adapted to initiate a voice call between the active users (i.e., between user A and user B). In other example, during a media sharing application, a user can share media with one or more other active users. In this scenario, the media sharing application can present a link (or widget or other user-interface element) that is adapted to initiate a voice call between the active users (i.e., between user A and user B). In yet another example, during a dating application, a user can view a profile of other users of the application. In this scenario, the dating application can present a link (or widget or other user-interface element) that is adapted to initiate a voice call between users (i.e., between user A and user B).

In response to the request initiated in block 257, the application 18A generates a displays a document on the user device 12A of user B. Preferably, the document is based on a template supplied dynamically from the Service 21. The document presents to user B a dialog box that prompts for a response from user B. In the preferred embodiment, the dialog box provides a notification message together with a prompt for three possible responses as follows:

<Screen Alias for User A> (or <SN user name for User A>) wishes to call you, please select from:
    <response 1> OK to call you
    <response 2> do not permit call
    <response 3> connect to voicemail Note that the calling party User A can be identified to the called party user B by a screen alias associated to user A as described above, and thus hide the social network user ID for user A from user B.

In block 261, the application 18A checks whether the response selected by user B is <response 2>—do not permit call and thus provides an indication that user B does not want to permit the call. If so, the call process continues to block 291 to communicate the call failure to the requesting user A. Otherwise, the operations continue to block 263.

In block 263, the application 18A generates and sends a message to messaging interface 22 of the service 21 over a communication link therebetween (block 207). In the preferred embodiment, the message is carried over an IP packet-based communication network linking the application 18A and the calling service 21 including the Internet as shown. The message preferably conforms to the SOAP/XML protocol to allow for efficient exchange of the information within the message. Alternatively, the message can conform to a predetermined RESTful architecture. This message includes the following:

user name (billyway) and social network domain (facebook.com) for the calling party;
    user name (tomjones) and social network domain (facebook.com) for the calling party;
    data specifying the request type (e.g., a voice call request for user B selection of <response 1>—Ok to call, or a voicemail request for user B selection of <response 3>—connect to voicemail;
    a domain key for the corresponding social network domain (e.g., DK for facebook.com); and an application key for the requesting social network application (18A).

In block 265, the messaging interface 22 of the service 21 receives the message communicated from application 18A in block 207.

In block 267, the logic block 24 evaluates the request type data carried in the received message to determine if the request is a voicemail request. If so, the operations continue to block 289. Otherwise, the operations continue to block 269.

In block 269, the logic block 24 evaluates the request type data carried in the received message to determine if the request is a voicecall request. If so, the operations continue to block 271. Otherwise, an unexpected error is encountered and the operations continue to block 293 to communicate the error to the requesting user A (and possibly to user B).

In block 271, logic block 24 performs a lookup of the information repository 26. As shown in FIG. 3, the information repository 26 stores information in electronic form, the information pertaining to social network users of the service 21, social network application developers and the social network applications that interface to the service 21, and one or more MNOs that provide resources for connecting calls to the social network users of the service 21. The information repository 26 further stores electronic information pertaining to the calls carried out by operation of the service 21. Access to information repository 26 is controlled according to each of the three user types as described above (type 1—social network users of the service, type 2—developer users associated with social network application developers that develop and/or maintain social network applications that interface to the service, and type 3—MNO users that are associated with MNOs that provide resources for connecting calls to social network users of the service). In the preferred embodiment, the information repository 26 is realized by an SQL database system as described above. In block 271, the query of the information repository 26 retrieves the following:

mobile device phone number, mobile carrier ID, and possibly other user information (for example, calling rules) for the calling party (billyway@facebook.com); and mobile device phone number, mobile carrier ID, and possibly other user information (for example, calling rules or blacklist parameters) for the called party (tomjones@facebook.com).

In block 273, logic block 24 determines whether the call should be blocked. For example, the calling rules or blacklist info of the called party as retrieved from the information repository 26 can dictate that the call should be blocked (or not). In yet another example, the calling rules of the calling party as retrieved from the information repository 26 can dictate that the call should be blocked (or not). In the event that logic block 24 determines that the call should be blocked, the processing continues to block 291. Otherwise, the processing continues to block 275.

Blocks 275 and 277 involve the control of the softswitch 28 that is part of the service 21. The softswitch 28 includes switching logic that is controlled by a calling agent. The switching logic includes resources that provide for bridging of connections that carry the bearer traffic for the legs of the call as described above.

In the exemplary embodiment, in block 275 the calling agent of the softswitch 28 cooperates with the call-setup-function (30A or 30B) of the MNO network for the calling party (preferably identified by the MNO ID of the calling party as retrieved from the information repository 26) to set up a connection (i.e., communication session) that carries bearer traffic for the leg of the call to the mobile device (29A or 29B) of the calling party. At the MNO side, the call-setup-function (30A or 30B) of the respective MNO network interfaces to a Radio Network Controller (RNC 34A or 34B) to carry out signaling functions with the calling party mobile device. If the call is accepted on the calling party mobile device, the call-setup-function (30A or 30B) of the respective MNO network interfaces to the corresponding gateway function (32A or 32B) to allocate resources to provide bearer traffic to and from the calling party mobile device (via the Base Station (36A or 36B) and RNC (34A or 34B) coupled to the calling party mobile device) over the connection to the softswitch 28. Typically, the respective gateway function (32A and 32B) provides media mapping and/or transcoding functions between potentially dissimilar networks.

In this manner, the resources of the MNO network of the calling party provides for bi-directional exchange of bearer traffic between the calling party mobile device and the softswitch 28. In 3G CDMA architectures, the gateway function (32A or 32B) of the MNO network is carried out by the Media Gateway (MGW), and the gateway control function (30A, 30B) is carried out by the MSC Server. In IMS architectures, the gateway function (32A or 32B) of the MNO network is carried out by the IMS Media Gateway (IMS-MGW), and the gateway control function (30A, 30B) is carried out by call session control functions (e.g., I-CSCF, S-CSCF and P-SCSF) in conjunction with the Media Gateway Control Function (MGCF). IN LTE-SAE architectures, the RNC and gateway functions (34A/32A or 34B/32B) of the MNO network is carried out by the Gateway (GW), and the gateway control function (30A, 30B) is carried out by the mobility management entity (MME). Similar functional elements are used in other architectures.

In block 277, the calling agent of the softswitch 28 cooperates with the call-setup-function (30A or 30B) of the MNO network for the called party (preferably identified by the MNO ID of the called party as retrieved from the information repository database 26) to set up a connection (i.e., communication session) that carries bearer traffic for the leg of the call to the mobile device (29A or 29B) of the called party. At the MNO side, the call-setup-function (30A or 30B) of the respective MNO network interfaces to a RNC (34A or 34B) to carry out signaling functions with the called party mobile device. If the call is accepted on the called party mobile device, the call-setup-function (30A or 30B) of the respective MNO network interfaces to the corresponding gateway function (32A or 32B) to allocate resources to provide bearer traffic to and from the called party mobile device (via the Base Station (36A or 36B) and RNC (34A or 34B) coupled to the calling party mobile device) over the connection to the softswitch 28. Typically, the respective gateway function (32A and 32B) provides media mapping and/or transcoding functions between potentially dissimilar networks. In this manner, the resources of the MNO network for the called party provides for bi-directional exchange of bearer traffic between the called party mobile device and the softswitch 28.

The provisioning loops of blocks 275 and 277 are similar to steps 215 and 217 described above with respect to FIGS. 4A and 4B.

In block 279, logic 24 evaluates the call connection status provided by the calling agent of softswitch 28 as a result of blocks 275 and 277 to determine whether a connection has been established to both the calling party user device and the called party user device. If so, the operations continue to blocks 281 to 287. Otherwise, the operation branches to blocks 289 to 293.

In block 281, softswitch 28 is controlled to bridge the connections to the calling party mobile device and the called party mobile device. Such bridging provides an end-to-end connection where the bearer traffic for each leg of the call flows through the softswitch 28. This configuration establishes connections between users while keeping their phone numbers private. In this mode, the softswitch 28 can exercise full control over the call and disconnect calls in progress if necessary.

In block 283, logic 24 initiates call logging for the call. In the preferred embodiment, such call logging operations stores a call record (26D) for the call in the information repository 26 (FIG. 3). The call record (26D) can include the start time, elapsed time, social network user id and domain (and alias name, if any) for the called party, social network user id and domain (and alias name, if any) for the calling party, the phone numbers for the user mobile device that terminates each call leg, and the AK (or application ID) for the social network application that requested the call. Other information can be included such as phone number charged for the call, a sequence number identifying the record, additional digits on the called number used to route or charge the call, the result of the call (whether it was answered, busy etc), the route for each leg of the call, and any fault condition encountered.

In optional block 285, logic 24 control messaging interface 22 to return a "call success" message to the requesting application (i.e., App Logic 1).

In optional block 287, the requesting application (i.e., App Logic 1) receives the "call success" message and performs predetermined processes based thereon. For example, it is contemplated that the application can update the user display for User A and User B to provide an indication of call success.

In optional block 289, softswitch 28 is controlled to bridge the connection from the calling party mobile device to the resources of the voicemail system 41 in order to allow the calling party to leave a voicemail message for access by the called party. In some circumstances (for example, where the called party answers and the calling party does not answer), softswitch 28 can be controlled to bridge the connection from the called party mobile device to the resources of the voicemail system 41 in order to allow the called party to leave a voicemail message for access by the calling party.

In optional block 291, logic 24 control messaging interface 22 to return a "call failure" message to the requesting application (i.e., App Logic 1).

In optional block 293, the requesting application (i.e., App Logic 1) receives the "call failure" message and performs predetermined processes based thereon. For example, it is contemplated that the application can update the user display to provide an indication of call failure.

Referring back to FIG. 3, the electronic information stored in the information repository 26 preferably includes the following for a particular social network user as illustrated in column 26A:
  social network user ID (e.g., billyway);
  social network domain (e.g., facebook.com) for the social network user ID;
  phone number for the mobile device of the social network user; in the preferred embodiment, this phone number is an MSISDN stored in non-volatile memory (e.g., SIM card) of the mobile device of the social network user.
  an MNO ID for the MNO that issued the user mobile device; this MNO maintains an account with an associated rate plan for calls to and/from the user mobile device;
  global activation parameter for the mobile device of the social network user; such global activation parameter can toggle between an ON and OFF state; in the ON state, calls cannot be placed to the user's mobile device; in the OFF state, all calls to the user's mobile device are blocked;
  global usage parameters, such as calling rules, blacklists or whitelists specified by the social network user;
  parameters pertaining to social network applications registered by the user, including for each social network application
    an app ID for the application,
    a user alias name for the application (if any), and
    application-specific usage parameters, such as calling rules, blacklists or whitelists specified by the social network user for the application;
  a view (e.g., stored query) of call record information (26D) for the social network user
    for each call originated by the social network user, the viewed call record information can include a start time, elapsed time, MNO ID for the user (calling party), called party alias name for the requesting application (or social network user id and domain of the called party), and app ID for requesting application;
    for each calls received by the social network user, the viewed call record information can include a start time, elapsed time, MNO ID for the user (called party), calling party alias name for the requesting application user (or social network user id and domain of the calling party), and app ID for requesting application;
    the viewed call record information can also include summary information derived therefrom (such as total number of calls and/or total call minutes for calls initiated and/or received by the social network user over a time period).

Other useful social network user information can be maintained by the database 26 if desired. In the preferred embodiment, the phone numbers for the user devices stored as part of the database 26 follow the standard E.164 format, SIP identifiers or other suitable URLs.

As illustrated in column 26B of FIG. 3, the application developer information stored in the information repository 26 preferably includes the following for each social network application developed by a particular application developer:
  the application key (AK) for the social network application;
  an app ID for the social network application;
  one or more social network domain(s) connected to by the social network application (e.g., facebook.com);
  a domain key (DK) for each social network domain(s) connected to by the social network application; and
  a view (i.e., stored query) to call record information (26D) for calls requested by the social network application (i.e., start time, elapsed time, user IDs (and/or alias names) and social network domain for the parties of the call, and the app ID for requesting application); it can also include summary information derived therefrom (such as total number of calls and/or total call minutes for calls initiated by an application over a time period).

Other useful application developer information can be maintained by the information repository 26 if desired.

As illustrated in column 26C of FIG. 3, the MNO information stored in the information repository 26 preferably includes the following for each MNO that provides resources for connecting calls to users of the service 21:
  gateway information (for provisioning connections to the MNO); and a view (i.e., stored query) to call record information for calls for serviced by the MNO (i.e., start time, elapsed time, phone number for the user mobile device that is terminated by the MNO for the call, and the app ID for requesting application).
Other useful MNO information can be maintained by the information repository 26 if desired.

As illustrated in row 26D of FIG. 3, the call record information stored in the information repository 26 preferably includes the following for each call serviced by the Service 21: a start time, elapsed time, social network user id and domain (and alias name if any) for the called party, social network user id and domain (and alias name, if any) for the calling party, the phone numbers for the user mobile device that terminates each call leg, and the AK (or application ID) for the social network application that requested the call. Other information can be included such as phone number charged for the call, a sequence number identifying the record, additional digits on the called number used to route or charge the call, the result of the call (whether it was answered, busy etc), the route for each leg of the call, and any fault condition encountered.

Users register with the service 21 and interact with the service 21 to specify the mobile phone number and carrier for the user's mobile device. Such information is stored and verified by a messaging loop between the specified device and the service 21. Once verified, the information for the user's mobile device is stored in the social network user record (26A) of the information repository database 26 (FIG. 3).

Figure 5A:
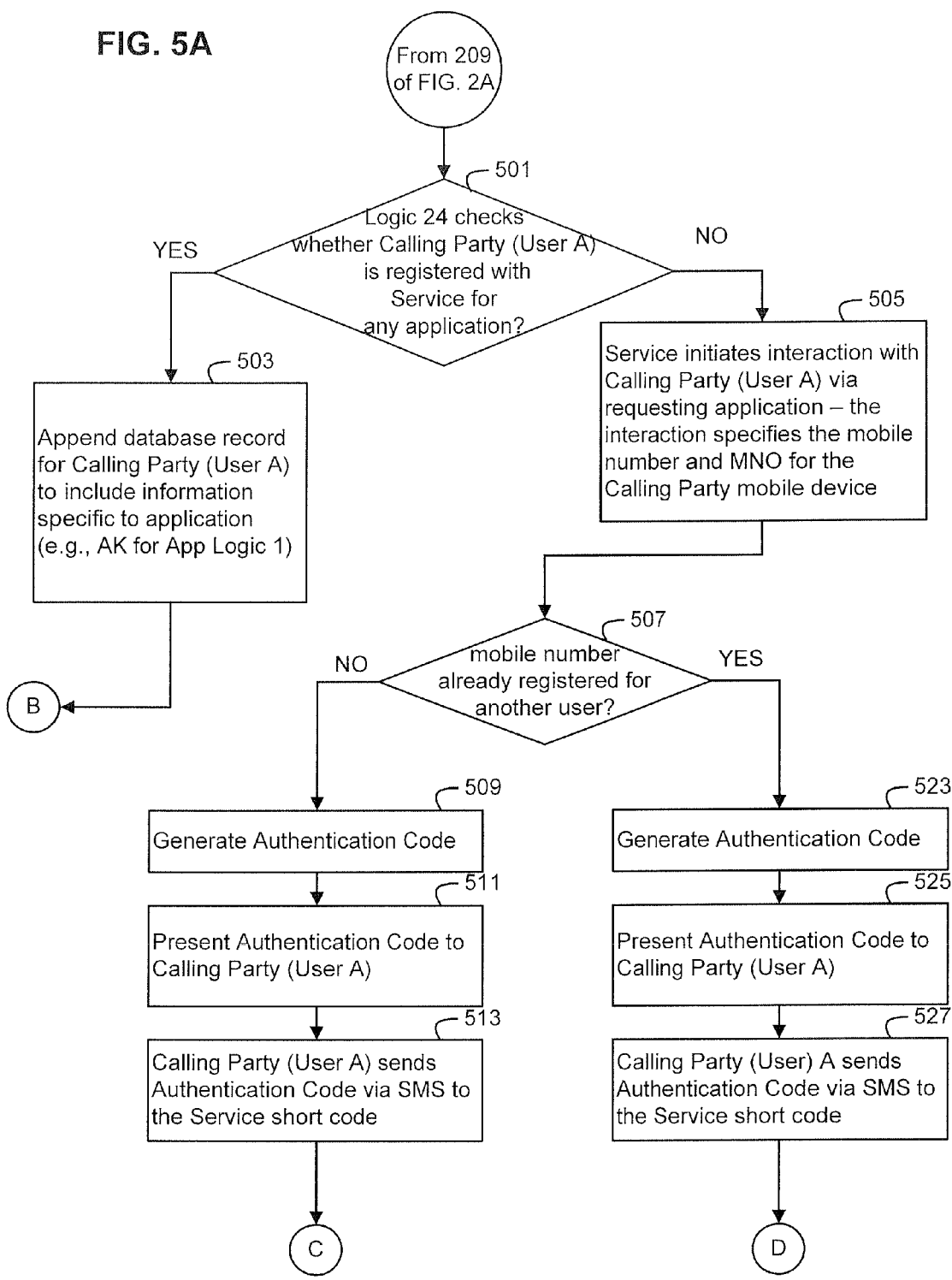
FIGS. 5A through 5B, collectively, is a flow chart illustrating operations for interacting with a user of the service to register phone number information with the user.
Figure 5B:
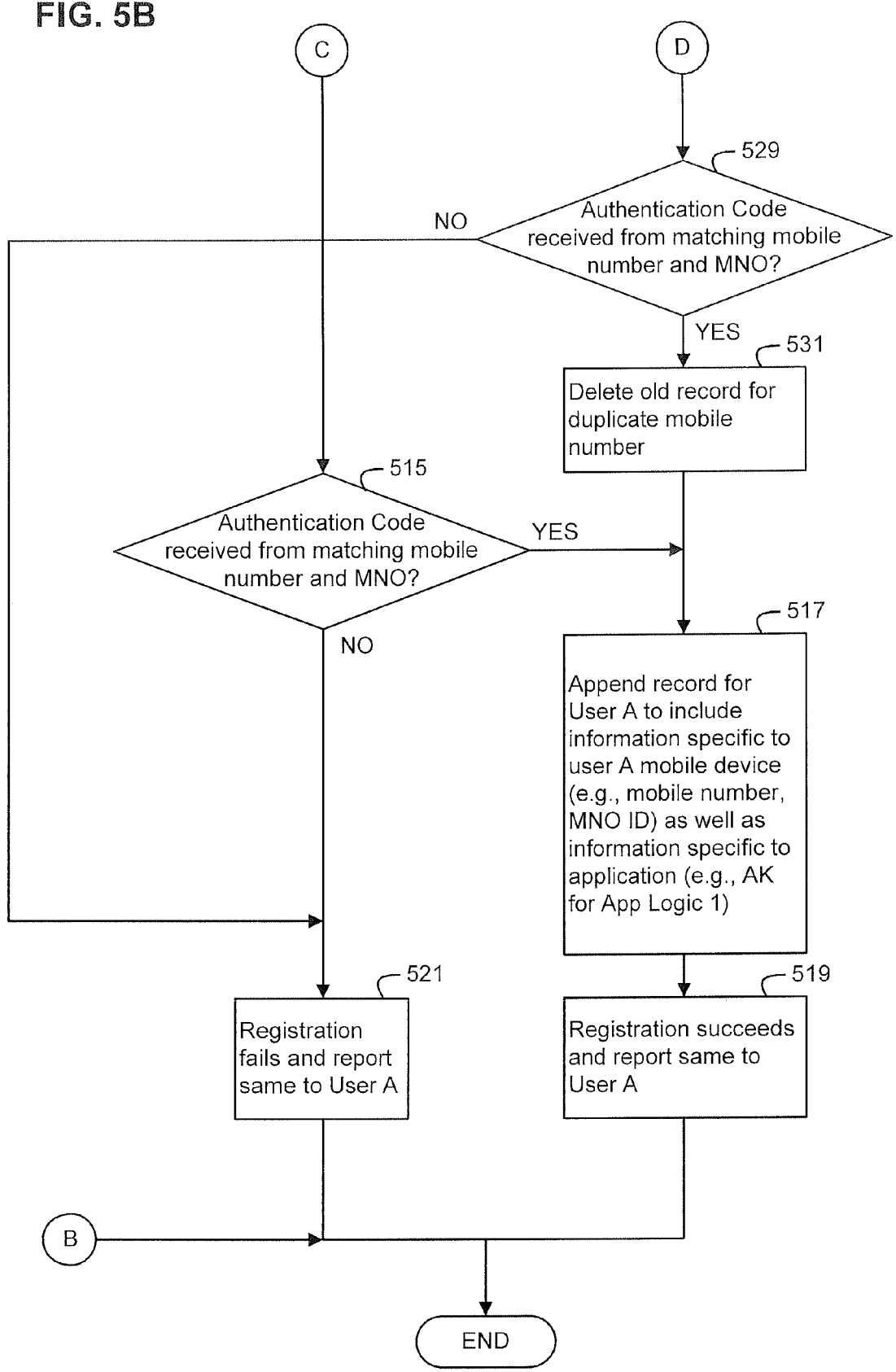

In the exemplary embodiment shown in FIGS. 5A and 5B, the user registration process is invoked upon the user initiating a voice call through a social network application as set forth in FIG. 2. In response to the service receiving a request from the social network application (step 209), the operations begin in block 501 where Logic 24 queries the information repository 26 to determine if the Calling Party (User A) is registered with the service 21 for any social network application (e.g., is there a social network user record for the calling party that provides a registered mobile device for the given user). If so, the operations continue to block 503 to append the social network user record (26A) for the calling party in the information repository 26 to include information specific to the requesting application. Such information can include the AK (or application ID) for the requesting application if not already associated with the particular user record. Otherwise, the operations continue to blocks 505 and 507.

In block 505, the service 21 initiates interaction with the calling party (i.e. User A), preferably via the requesting application (e.g. 18A), whereby the calling party (User A) specifies the mobile number and the MNO of a mobile device to be used for calls to the calling party (User A).

In block 507, logic 24 queries the information repository 26 to determine if the mobile number specified by the calling party (User A) in block 505 is already registered by another user of the service. If not, the operations continue to blocks 509 to 515. Otherwise, the operations continue to blocks 523 to 529.

In block 509, logic 24 generates an authentication code (for example, a random multi-digit alphanumeric code) for purposes of verifying the mobile device number specified by the calling party (User A) in block 505.

In block 511, the service 21 interacts with the calling party (User A) to present the authentication code generated in block 509. It can also utilize other communication channels (such an email message or social network message to the calling party) in order to present the authentication code to the calling party (User A). The communication from the service 21 to the calling party also preferably provides an SMS short code assigned to the service 21 for the verification process.

In block 513, the calling party (User A) utilizes the mobile device specified in block 505 to send the authentication code as part of an SMS message addressed to the short code assigned to the service 21 as provided in block 511.

In block 515, the service 21 receives the SMS message supplied from the calling party mobile device (513) and addressed to its short code, and compares the authentication code supplied therein to the authentication code communicated to the calling party in block 511. If the authentication codes match, the operations continue to blocks 517 to 519. Otherwise, the operations continue to block 521.

In block 517, logic 24 appends the social network user record (26A) for the calling party (User A) in the information repository 26 to include information specific to the calling party mobile device as well as information specific to the requesting application. Such information includes the mobile phone number and MNO ID for the calling party mobile device as well as the AK (or application ID) for the requesting application.

In block 519, the messaging verification loop of the registration process has succeeded and the service 12 interacts with the calling party (User A) to communicate such success. The service 21 can also utilize other communication channels (such an email message or social network message to the calling party) in order communicate such success to the calling party (User A).

Blocks 523 to 529 address the scenario where the mobile number specified by the calling party (User A) in block 505 is already registered by another user of the service 21.

In block 523, logic 24 generates an authentication code (for example, a random multi-digit alphanumeric code) for purposes of verifying the mobile device phone number specified by the calling party (User A) in block 505.

In block 525, the service 21 interacts with the calling party (User A) via the requesting application 18A to present the authentication code generated in block 523. The service 21 can also utilize other communication channels (such an email message or social network message to the calling party) in order to present the authentication code to the calling party (User A). The communication from the service 12 to the calling party (user A) also preferably provides an SMS short code assigned to the service 21 for the verification process.

In block 527, the calling party (User A) utilizes the mobile device specified in block 505 to send the authentication code as part of an SMS message addressed to the short code of the calling service as provided in block 525.

In block 529, the calling service 21 receives the SMS message supplied from the calling party mobile device (527) and addressed to its short code, and compares the authentication code supplied therein to the authentication code communicated to the calling party in block 525. If the authentication codes match, the operations continue to block 531. Otherwise, the operations continue to block 521.

In 531, logic 24 deletes the mobile phone number from the other matching social network user record (26A). Such operations automatically reclaim phone numbers that have been ported, lost, re-used or otherwise re-assigned to a new individual or organization. In this manner, the service 21 provides a self-healing mechanism for the social network user records (26A) of the information repository 26 and thus insure accuracy of such user records. The operations then continue to block 517 where logic 24 appends the social network user record (26A) for the calling party (User A) in the information repository 26 to include information specific to the calling party mobile device as well as information specific to the requesting application as described above and then report registration success to the calling party (user A) in block 519.

Block 521 addresses the scenario where the messaging verification loop of the registration process fails. In block 521, the service 21 interacts with the calling party (User A) to communicate such failure. It can also utilize other communication channels (such an email message or social network message to the calling party) in order communicate such failure to the calling party (User A).

The user registration process of FIGS. 5A and 5B is also be invoked for the called party. In this manner, the called party interacts with the calling service 21 to specify the mobile phone number and MNO for the user's mobile device. Such information is stored and verified by a messaging loop between the specified device and the calling service 21. Once verified, the information for the social network user's mobile device is stored in the social network user record (26A) of the information repository 26 (FIG. 3). In the preferred embodiment, the user registration process for all legs of the call are carried out in parallel.

It is also contemplated that user can register their phone numbers with the service 21 by other means. For example, the registration process can be carried out by an Interactive Voice Response system accessible by calling a designated number, or by a web portal reachable over the Internet at designated URL. Each of these processes preferably employs a challenge process that involves the communication of an authentication code to the user and the user supplying the authentication code for matching and authentication as part of the registration process. In the preferred embodiment, the device to which the registered phone number is to be assigned is used to communicate the authentication code for authentication and authorization of the user as part of the registration process. This human-challenge authentication loop preferably involves both the human that possess the particular device as well as the communication medium through which the particular device is registered to ensure accuracy of the registration process.

Developers of social network applications register with the service 21 to request issuance of application keys. Each application key provides authentication of request messages that initiate voice calls from a particular application. Once issued, the application key is stored in an application developer record (26B) of the ENUM database (FIG. 3).

Figure 6:
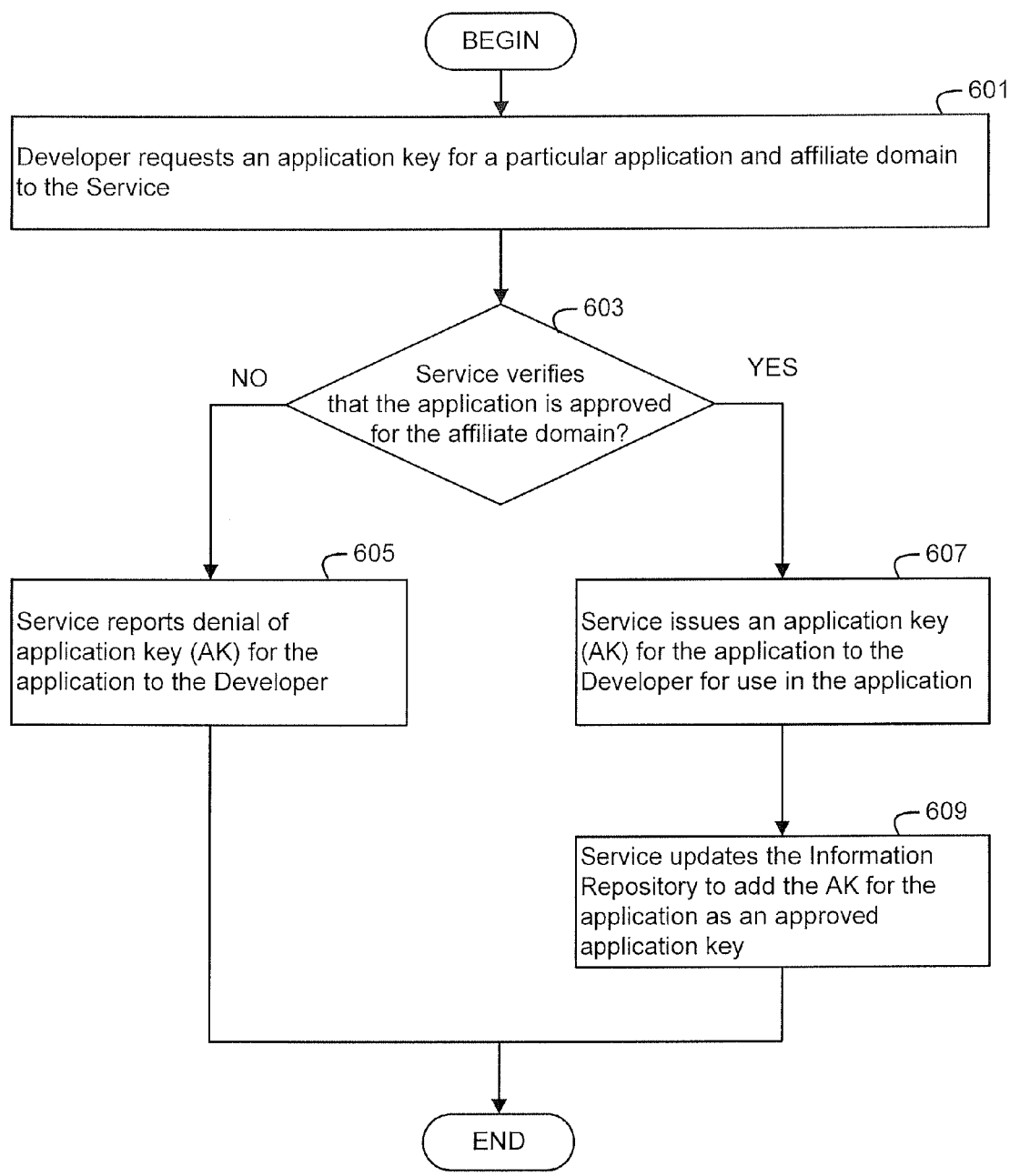
FIG. 6 is a flow chart illustrating operations for issuing an application developer a developer key and storing the developer key in the ENUM database of FIG. 1; the stored developer key is used for subsequent authentication of service request messages communicated from the social network application of the developer to the calling service.

In the exemplary embodiment shown in FIG. 6, the developer registration process begins in block 601 where the application developer requests an application key (AK) for a particular application and affiliate social network domain. This request can be communicated via email, a phone call, or by submission of information as part of electronic forms served to the respective developer over the Internet by an HTTP server or the like as part of the access function 43.

In block 603, the service 21 verifies that the particular application of the request of block 601 is approved for the corresponding affiliate social domain network of the request of block 601. This can be accomplished by a manual verification process. If not, the operations continue to block 605. Otherwise, the operations continue to blocks 607 to 609.

In block 605, the service 21 reports a denial of the application key to the developer. Such reporting can be communicated via email, a phone call, or by submission of information as part of electronic forms served to the respective developer over the Internet by an HTTP server and the like as part of the access function 43.

In block 607, the service 21 issues an application key for the particular application of the request of block 601 and updates the application developer record (26B) of the information repository 26 to include the application key (and possibly an application ID) for the particular application.

In block 609, the service 21 reports the application key to the developer. Such reporting can be communicated via email, a phone call, or by submission of information as part of electronic forms served to the respective developer over the Internet by an HTTP server and the like as part of the access function 43. The application developer utilizes the application key as part of the logic of the particular application that initiates the communication of request messages (step 207) to the service 21. The request messages function to initiate voice calls from the particular application. The application key authenticates such request messages as originating from the particular application.

The access function 43 of the service 21 provides a web portal that allows social network users, application developer users and MNO users to access information stored in the information repository 26. The access function 43 controls access to the information stored in the information repository 26 as described above.

The access function 43 can authenticate users, application developers and carriers by any conventional authentication methods, such as user names and passwords, biometrics, a passport or an ID-card or others. Multi-factor schemes can be employed utilizing more than one of these mechanisms. Once authenticated, the access function provides for controlled access to designated information for the authenticated user.

The access function 43 preferably allows a type 1 social network user to review and update user information (26A of FIG. 3) as well as generate and review user-specific reports. The user information can include global activation parameters and/or application-specific activation parameters that selectively activate (or deactivate) the user' registered phone from being used in conjunction with the service 21. The user information can also include global and/or application specific usage parameters (e.g., whitelists/blacklists/alias). The user-specific reports can provide for details of calls place by or to the respective social network user as maintained by call record information viewable by the social network user. It can also provide for filters (e.g., show calls to a particular user, calls in a particular date range, calls placed from a particular application) and summaries (e.g., call minutes for a given time period). As described above in detail, the access function 43 does not allow the social network user to access user information for other social network users as well as the application developer information (26B of FIG.) and the MNO information (26C of FIG. 3) of the information repository 26.

The access function 43 preferably allows type 2 application developer users to review and update application developer information (26B of FIG. 3) as well as generate and review developer-specific (or application-specific) reports. The developer-specific reports can provide for details of calls place by one or more applications of the respective developer as maintained by the call record information viewable by the corresponding application developer. It can also provide for filters (e.g., show calls placed from a particular application, calls in a particular date range, calls placed to/from a particular user) and summaries (e.g., call minutes for a given time period). As described above in detail, the access function 43 disallows access to information from other application developers as well as social network user information (26A of FIG. 3) and MNO information (26C of FIG. 3) of the information repository 26.

The access function 43 also preferably allows type 3 MNO users to review and update MNO information (26C of FIG. 3) as well as generate and review MNO-specific reports. The MNO-specific reports can provide for details of calls serviced by the MNO as maintained by call record information viewable by the MNO. It can also provide for filters (e.g., show calls placed from a particular application, calls in a particular date range, calls placed to/from a particular user) and summaries (e.g., call minutes for a given time period). As described above in detail, the access function 43 disallows access to information from other MNOs as well as social network user information (26A of FIG. 3) and application developer information (26B of FIG. 3) of the information repository 26.

Figure 7A:
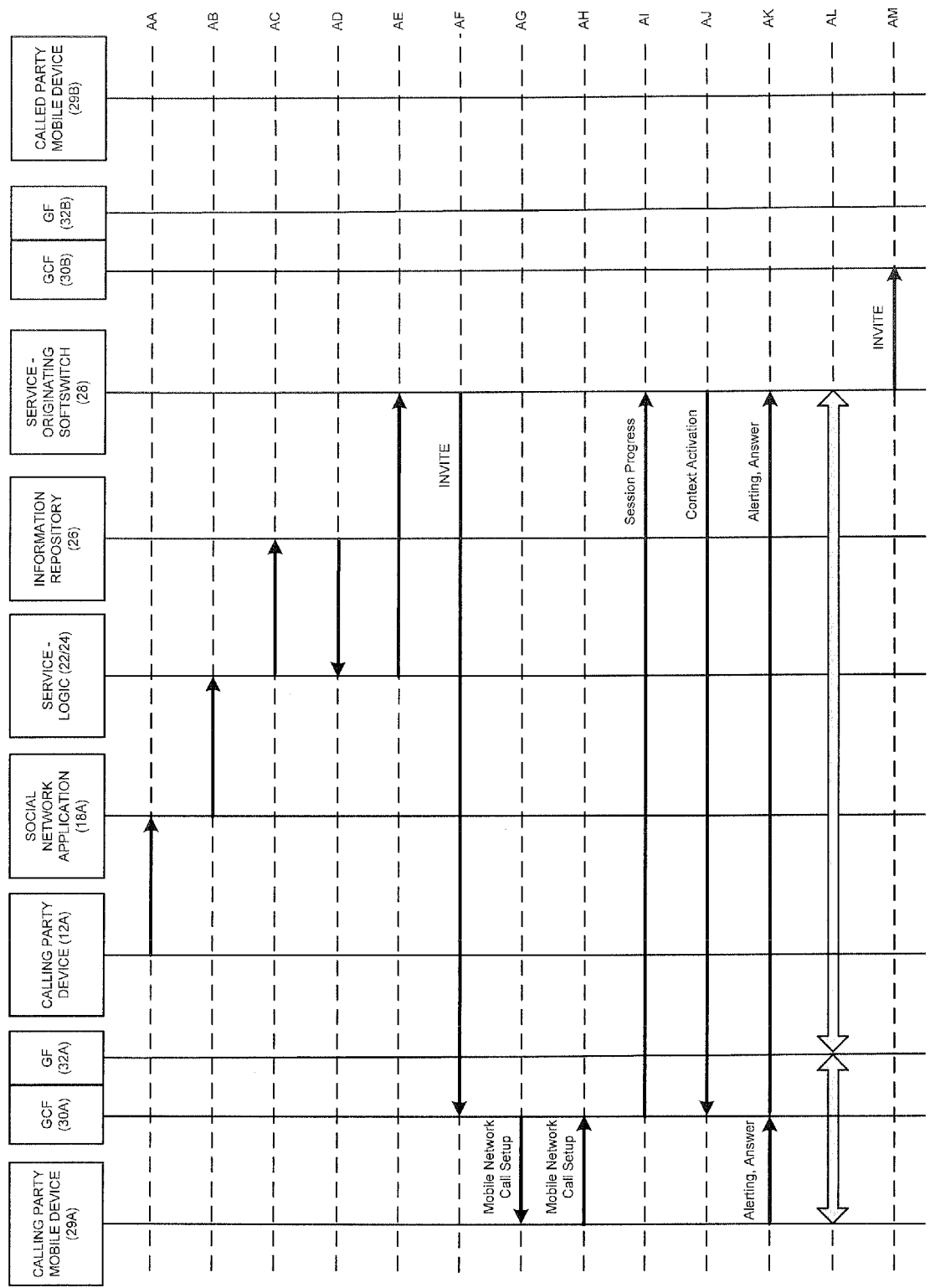
FIGS. 7A-7C, collectively, is an exemplary message flow diagram illustrating the operations carried out by the system of FIG. 1 in accordance with the present invention, the message flow provisions resources (and tears down such resources) that carry out a voice call between a calling party mobile device and a called party mobile device as initiated by the user interaction with a social network application.
Figure 7B:
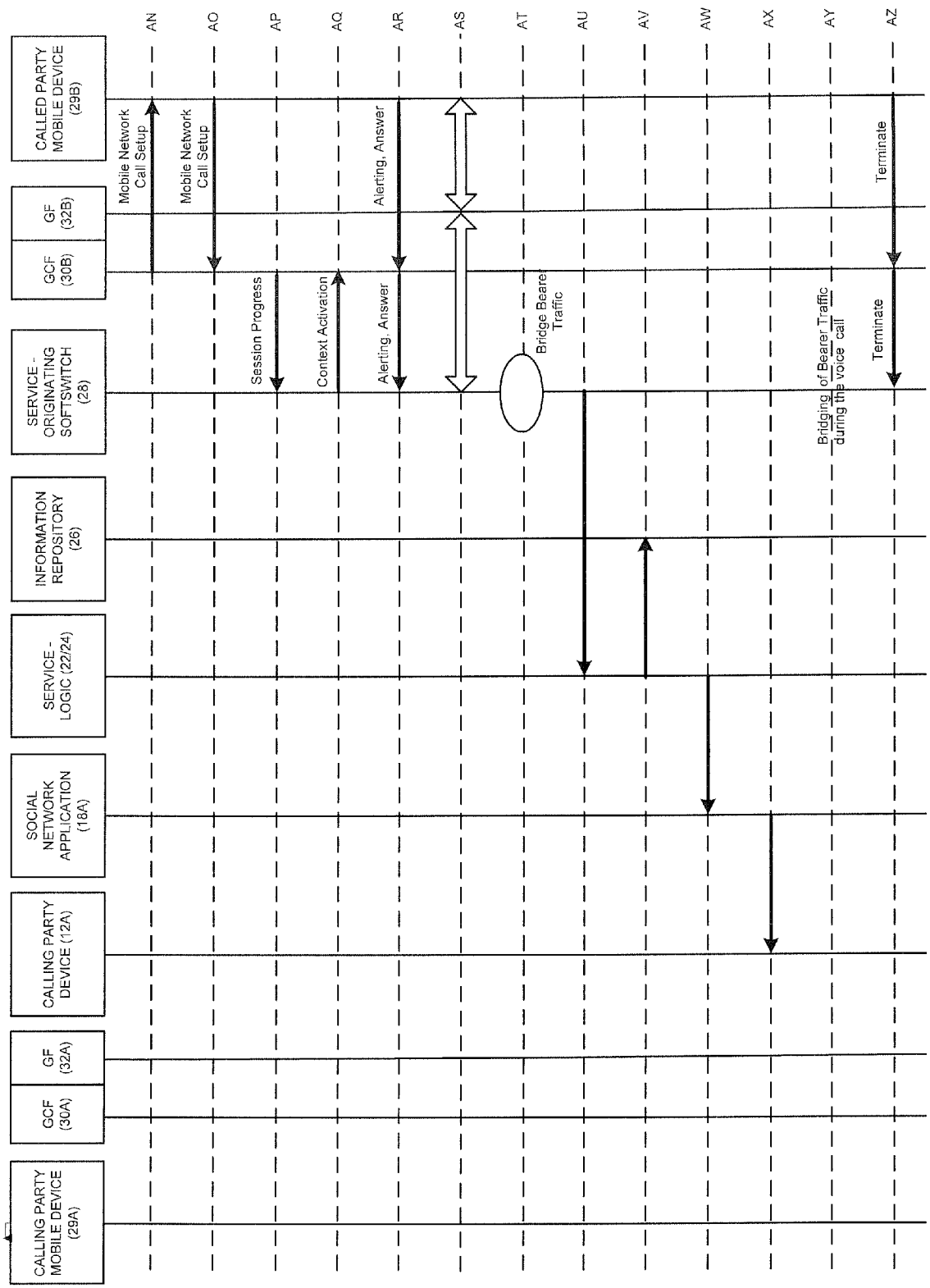
Figure 7C:
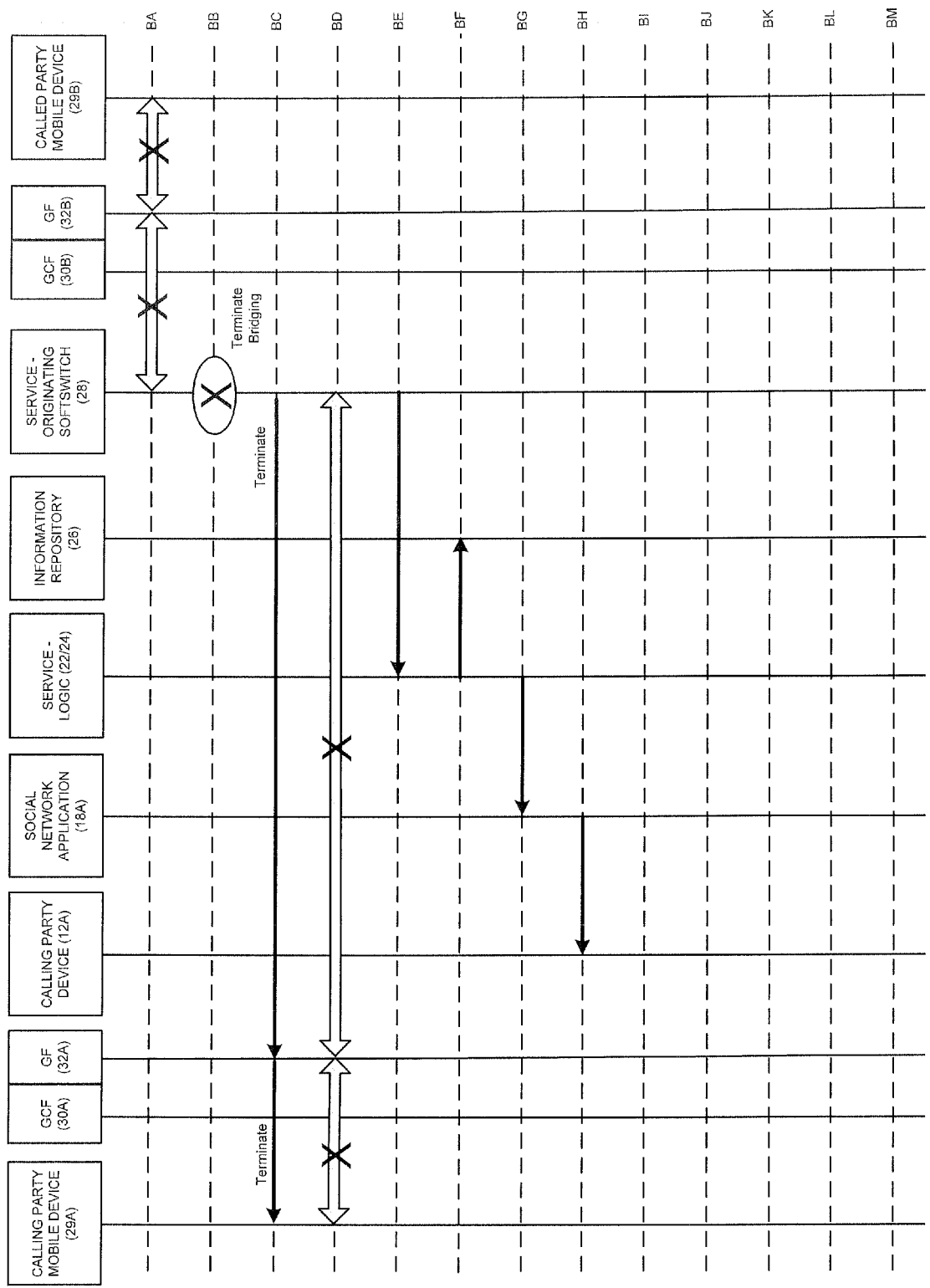

FIGS. 7A-7C is an exemplary message flow diagram illustrating the operations carried out by the system of FIG. 1 in accordance with the methodology of the present invention. The message flow operates to provision resources (and tears down such resources) that carry out a voice call between a calling party mobile device and a called party mobile device as initiated by the user interaction with a social network application. It is assumed that a calling party user (user A) operates user device 12A and invokes a social network application (referred to as "App Logic 1" and labeled 18A) via the Internet. In response thereto, the social network application 18A connects to the online social network service I (14A) through framework 16A to authenticate the user A, e.g., a logon process for the service, for example, using the user name (billyway) and password (XXXX) assigned to user A. The framework 16A also provides for authorization that controls access by the social network application 18A to user A profile data (if such authorization has not yet been provided). Once user A is authenticated and the application authorized, the social network application 18A and the framework 16A provide a mechanism (for example, a token) that allows the social network application 18A to access user A profile data via the framework 16A. Similar operations are carried carry out for social network user B.

In AA, during execution of the social network application 18A, the application 18A presents user A with a link (or widget or other user-interface element) that is adapted to initiate a voice call to user B (tomjones@facebook.com) upon user interaction with the element. User A then interacts with the element (for example, by clicking on the link) to initiate a voice call to user B (block 205 or 257).

In AB, the application 18A generates and sends a message to messaging interface 22 of the service 21 over a communication link therebetween (block 207 or 263).

In AC, the messaging interface 22 of the service 21 receives the message communicated from application 18A and controls the logic block 24 to perform a lookup of the information repository 26 (block 211 or 271).

In block AD, the query of the information repository 26 retrieves the following:
  mobile device phone number, mobile carrier ID, and possibly other user information (for example, calling rules) for the calling party (billyway@facebook.com); and
  mobile device phone number, mobile carrier ID, and possibly other user information (for example, calling rules or blacklist parameters) for the called party (tomjones@facebook.com).

In block AE, the logic block 24 determines whether the call should be blocked. For example, the calling rules or blacklist info of the called party as retrieved from the information repository 26 can dictate that the call should be blocked (or not). In yet another example, the calling rules of the calling party as retrieved from the information repository 26 can dictate that the call should be blocked (or not). In the event that logic block 24 determines that the call should not be blocked, the logic block 24 controls the calling agent of the softswitch 28 to performs a provisioning loop (AF-AK) that carries out call set-up and signaling with the gateway control function 30A of the MNO network for the mobile device 29A of the calling party user A as well as a provisioning loop (AM-AR) that carries out call set-up and signaling with the gateway control function 30B of the MNO network for the mobile device (29B) of the called party B.

The provisioning loop AF-AK sets up connections (i.e., communication sessions) that carry bearer traffic for the leg of the call to the mobile device 29A of the calling party.

In AF, a provisioning request message (e.g., SIP request) is communicated from the softswitch 28 to the call-setup-function 30A of the MNO network that services the mobile device phone number of the calling party mobile device. The provisioning request message includes the mobile device phone number of the calling party mobile device and possibly call profile data. The call profile data can provide information related to the call that can be used for authorization and/or accounting purposes by the respective MNO. The call-setup-function 30A of the MNO network utilizes the mobile device phone number and the call profile data to selectively authorize the call. The call profile data can be used for accounting purposes by the MNO as needed.

Once the call is authorized, the call-setup-function 30A of the MNO network performs mobile network call setup signaling in conjunction with session progress and context activation with the softswitch 28 in AG through AK as is well known.

The connections that carry bearer traffic for the leg of the call to the mobile device 29A of the calling party are represented graphically in AL.

The provisioning loop AM-AR sets up connections (i.e., communication sessions) that carries bearer traffic for the leg of the call to the mobile device 29B of the called party. Such connections are represented graphically in AS.

In AM, a provisioning request message (e.g., SIP request) is communicated from the softswitch 28 to the call-setup-function 30B of the MNO network that services the mobile device phone number of the called party mobile device. The provisioning request message includes the mobile device phone number of the called party mobile device and possibly call profile data. The call profile data can provide information related to the call that can be used for authorization and/or accounting purposes by the respective MNO. The call-setup-function 30B of the MNO network utilizes the mobile device phone number and the call profile data to selectively authorize the call. The call profile data can be used for accounting purposes by the MNO as needed.

Once the call is authorized, the call-setup-function 30B of the MNO network performs mobile network call setup signaling in conjunction with session progress and context activation with the softswitch 28 in AN through AR as is well known.

The connections that carry bearer traffic for the leg of the call to the mobile device 29B of the called party are represented graphically in AS.

In AT, when the connections for both legs of the calls have been established, the softswitch 28 is controlled to bridge the connections to the calling party mobile device and the called party mobile. Such bridging provides an end-to-end connection where the bearer traffic for each leg of the call flows through the softswitch 28. This configuration establishes connections between users while keeping their phone numbers private. In this mode, the softswitch 28 can exercise full control over the call and disconnect calls in progress if necessary.

In AU and AV, the logic 24 initiates call logging for the call. In the preferred embodiment, such call logging operations stores a call record (26D) for the call in the information repository 26 (FIG. 3).

In AW and AX, the logic 24 control messaging interface 22 to return a "call success" message for presentation to the calling party on device 12A.

In AZ, the called party terminates the call by signaling, which tears down the connections for the call and bridging function performed by the softswitch 28 in BA through BD. to the requesting application (i.e., App Logic 1).

In BE and BD, the logic 24 updates the call records for the call in the information repository 26 (FIG. 3), for example to store the call duration and possibly other parameters.

In BE and BH, the logic 24 control messaging interface 22 to return a "call termination" message for presentation to the calling party on device 12A.

In alternate embodiment, the operations of the system components as described herein can be modified to perform other operations that provision resources (and tears down such resources) that carry out a voice call between a calling party mobile device and a called party mobile device as initiated by the user interaction with a social network application.

For example, during execution of the social network application, the request can be communicated from the user machine to the service 21 by redirection and/or scripts.

Figure 8:
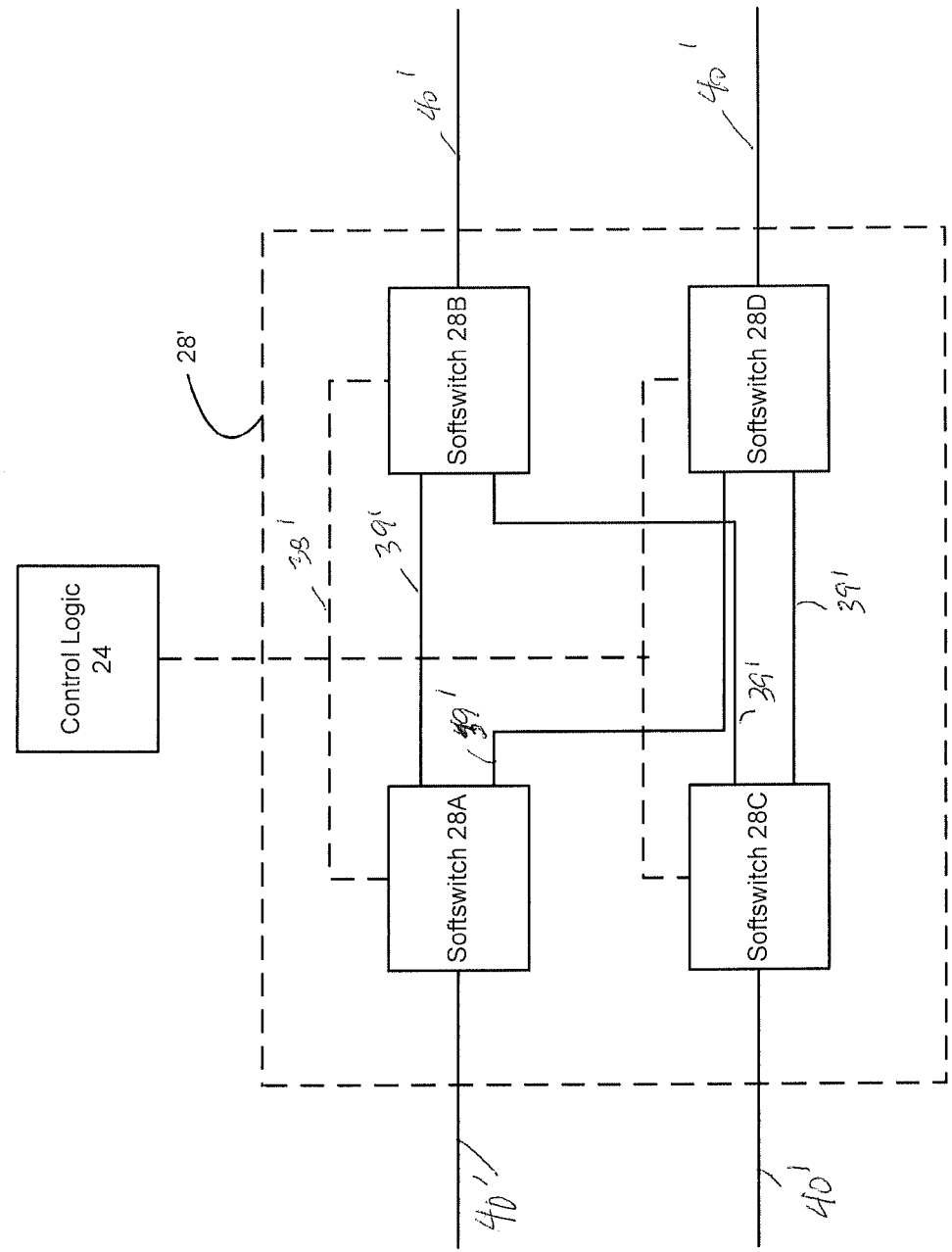
FIG. 8 is a block diagram of a distribute softswitch architecture that can be used as part of the system of FIG. 1.

In another example, the functionality of the softswitch 28 can be distributed in nature as shown in FIG. 8. In this configuration, multiple softswitches (for example, 4 shown as 28A, 28B, 28C, and 28D) are provided. Each softswitch (28A, 28B, 28C, or 28D) has one or more interconnection trunks 40' to external gateways/switches (e.g., gateway functions 32A and 32B of FIG. 1). In addition, each softswitch (28A, 28B, 28C, or 28D) has one or more interconnection trunks 39' to the other softswitches of the group 28'. The interconnection trunks 39' and 40' can use time-division multiplexing (TDM), internet protocol (IP) and/or asynchronous transfer protocol (ATM) for communication of bearer traffic therebetween. Control logic 24 is interconnected to the softswitches (28A, 28B, 28C, and 28D) of the group 28' by a communication network 38'. The control logic 24 controls the softswitches (28A, 28B, 28C, and 28D) of the group 28' to service the legs of a particular voice calls. Bridging of the legs can be accomplished within a given softswitch or by multiple softswitches connected over the interconnection trunks 39'.

The softswitches (28A, 28B, 28C, and 28D) of the group 28' can be geographically distributed such that the softswitches (28A, 28B, 28C, and 28D) serves geographic areas which are remote from one another and possibly remote from the physical location of the control logic 24. Among other things, handling a voice call by the distributed softswitches can be desirable in some situations, such as when the geographic distribution of the softswitches allows the service operator to minimize long distance fees that can be avoided by serving the call utilizing the distributed softswitches of the group 28'.

In yet another example, it is contemplated that the connections and bridging functionality for the voice call can be provisioned by the servicing operator gateway for the calling party and/or the called party. Caller ID blocking functionality can be invoked to maintain the private nature of the phone numbers to the parties of the call.

In still another example, the service as described herein can be integrated into the services/application layer of an MNO network itself in order to provide advanced services to the mobile users serviced by the MNO. In this example, Caller ID blocking functionality of the MNO can be invoked to maintain the private nature of the phone numbers to the parties of the call.

Moreover, the operations of telecommunication service as described herein can be extended to other advanced communication functions between online social network users. For example, the softswitch of the service can be adapted to service voice calls to landlines over the PSTN and/or to SIP phones over the Internet, multiparty voice conferencing between users, real-time chat between users, H.323 video conferencing between users, file sharing between users, and media content streaming between users. The service can also provide other communication functions between users, such as SMS messaging, MMS messaging, email messaging, etc.

For SMS messaging, the input of the originating party generates a text string that is supplied as part of the request message communicated to the service 21. The request message also includes the user name and domain of the recipient as well as the user name and domain of the originating party. The service 21 performs a lookup of the social network user information (26A) for the recipient user to retrieve the phone number for the mobile device of the recipient user, encapsulates the text string supplied in the request as part of an SMS message addressed to the mobile device of the recipient user, and forwards the SMS message to the MNO network of the recipient user.

For Callme functionality, a registered user of the service (referred to herein as the requesting subscriber) is presented with a Callme widget associated with another registered user of the service 21 (referred to herein as the recipient subscriber) during execution of the social network application. By clicking on this Callme widget, the social network application triggers the communication of a request message to the service 21. Alternatively, the request message is triggered after presentation of a notification message and response submission from the called party (similar to block 259). The request message includes the user name and domain of the requesting subscriber as well as the user name and domain of the recipient subscriber. The service 21 performs a lookup of the social network user information (26A) for the requesting subscriber to retrieve the phone number (or static IP address) for the telephony device of the requesting subscriber as well as a lookup of the social network user information (26A) for the recipient subscriber to retrieve the phone number (or static IP address) for the telephony device of the recipient subscriber. These numbers are then used to set up a telephony call between the telephony devices for the requesting and recipient subscribers as described herein.

Such Callme functionality can also be extended to allow an unregistered user of the service 21 to place a call to a registered user (referred to herein as the requesting user) of the service 21 during execution of the social network application. In this case, the unregistered user is presented with a Callme widget associated with the registered user (referred to herein as the recipient subscriber) during execution of the social network application. By clicking on this Callme widget, the social network application triggers the communication of a request message to the service 21. This request message includes the user name and domain of the requesting user as well as the user name and domain of the recipient subscriber. The service 21 performs a lookup of the social network user information (26A) for the requesting user. This lookup fails because the requesting user is not registered with the service 21. The requesting user can then be presented with an interface that provides for registration with the service 21. After registration is complete (i.e., the requesting user has registered and verified an association to a mobile device identifier), the operations continue to set up a telephony call between the telephony devices for the requesting and recipient subscribers as described herein. Alternatively, in the case where the lookup fails, the requesting user can be presented with an interface that allows the requesting user to enter a character string that represents a phone number for a device to call. This character string is supplied as part of a message to the service 21 and the supplied phone number is used to set up a telephony call between the telephony devices for the requesting user and recipient subscriber as described herein.

Other telecommunication functions can be provided. For example, the service 21 can be adapted to connect to a plurality of registered devices for a given user. Such connections can be carried out in parallel or in an ordered sequence. The registered devices, and control over the sequence of connections can be dictated by user information updated by the user through the access logic 43.

Advantageously, the service 21 as described herein carries out the requested telecommunication function while maintaining the privacy of the device identifiers (phone numbers) with respect to the parties as well as to the social network application that was used to initiate the function. By maintaining such privacy, the device identifiers (phone numbers) are hidden from (i.e., not presented to) the parties as well as to the social network application that was used to initiate the function. This affords greater protection against unwanted distribution of the private phone numbers of the parties.

It is also contemplated that static IP addresses can be used as device identifiers for the social network user's telecommunication devices of the present invention. Such static IP addresses can be assigned to the user devices by the network operator. Such as a static IP address is preferably stored in a non-volatile memory of the respective device. The static IP address is preferably permanent in nature. The static IP address can be stored in a pluggable memory card (e.g., SIM card) and loaded into the respective device if desired.

There have been described and illustrated herein several embodiments of a system and method for establishing communication between online social network users. While particular embodiments of the invention have been described, it is not intended that the invention be limited thereto, as it is intended that the invention be as broad in scope as the art will allow and that the specification be read likewise. Thus, while particular communication technologies, system architectures, message formats and database architectures have been disclosed, it will be appreciated that other current and future communication technologies, system architectures, message formats and database architectures can be used as well to carry out the communication processing of the present invention as described herein. For example, it is contemplated that an online social network itself can interface to the calling service to provide advanced telecommunication functions carried out by the service as described herein. In this scenario, the online social network can be viewed as an application developer in registering and interface to the service. In another example, it is contemplated that the unitary database 26 as described herein and/or the access function associated therewith can be partitioned into multiple parts in order to segregate the data for the intended access control. In another example, the softswitch can function in a routed mode such that all signaling messages for the call flow through the softswitch. However, the bearer traffic does not flow through the softswitch but is exchanged gateway-to-gateway. In routed mode, the softswitch exercises substantial degree of call control and can disconnect calls in progress if necessary. It therefore will be appreciated by those skilled in the art that yet other modifications could be made to the provided invention without deviating from its spirit and scope as claimed.

What is claimed is:

1. A method for servicing communication requests from social network users, the method comprising:
    maintaining an information repository configured to electronically store a user-profile for each of a first plurality of social network users, said user-profile including at least one social network user identifier used by a social network to identify the social network user and at least one device identifier for a communication device of the social network user;
    controlling access to data stored in the information repository by social network users;
    receiving an electronic request to initiate a telecommunication function involving a second plurality of social network users, the electronic request being issued in conjunction with execution of a social network application by a social network user and identifying each one of the second plurality of social network users by their social network user identifier stored in their user-profile;
    accessing the information repository to query the user-profile for each one of the second plurality of social network users wherein said accessing retrieves a device identifier for at least one of the second plurality of social network users identified in the electronic request by the social network user identifier stored in the respective user-profile; and
    initiating the electronically requested telecommunication function including communication to devices of the second plurality of social network users corresponding to at least one device identifier retrieved from the information repository.

2. A method according to claim 1, further comprising:
    allowing access to user-profile for a particular social network user by the particular social network user while blocking access to the user-profile for the particular social network user by other social network users.

3. A method according to claim 1, wherein:
    said information repository further stores developer information corresponding to at least one social network application (SNA) developed and/or maintained by a respective SNA developer; and
    the method further comprises controlling access to data stored in the information repository by developer users associated with a respective SNA.

4. A method according to claim 3, further comprising:
    allowing access to user-profile for a particular social network user by the particular social network user while blocking access to the user-profile for the particular social network user by select users including other social network users and all developer users; and
    allowing access to developer information pertaining to a particular SNA for one or more developer users associated with the particular SNA while blocking access to the developer information pertaining to the particular SNA by select users including developer users associated with other SNAs and all social network users.

5. A method according to claim 3, wherein:
    said information repository further stores mobile network operator (MNO) information corresponding to a respective MNO; and
    the method further comprises controlling access to the MNO information stored in the information repository by MNO users associated with a respective MNO.

6. A method according to claim 5, further comprising:
allowing access to user-profile for a particular social network user by the particular social network user while blocking access to the user-profile for the particular social network user by select users including other social network users, all developer users and all MNO users;
allowing access to developer information pertaining to the particular SNA for one or more developer users associated with the particular SNA while blocking access to the developer information pertaining to the particular SNA by select users including developer users associated with other SNAs, all social network users and all MNO users; and
allowing access to MNO information pertaining to the particular MNO for one or more MNO users associated with the particular MNO while blocking access to the MNO information pertaining to the particular MNO by select users including MNO users associated with other MNOs, all social network users and all developer users.

7. A method according to claim 1, wherein:
the telecommunication function involves voice communication amongst the second plurality of social network users, wherein the voice communication involves a plurality of communication connections to communication devices for the second plurality of social network users, at least one of the communication devices identified by corresponding device identifier retrieved from the information repository.

8. A method according to claim 1, wherein:
the telecommunication function involves SMS communication from a sending social network user, wherein the SMS communication involves a communication connection to a communication device for the respective recipient social network user, the communication device identified by corresponding device identifier retrieved from the information repository.

9. A method according to claim 1, wherein:
the at least one device identifier for a given social network user as stored in the user-profile of the information repository comprises a phone number assigned to a particular mobile telephony device associated with the given social network user, the phone number stored in non-volatile memory of the particular mobile telephony device.

10. A method according to claim 1, wherein:
the at least one device identifier for a given social network user as stored in the user-profile of the information repository comprises a phone number assigned to a particular PSTN line associated with the given respective social network user.

11. A method according to claim 1, wherein:
the at least one device identifier for a given social network user as stored in the user-profile of the information repository comprises an IP address assigned to a communication device associated with the given social network user.

12. A method according to claim 1, further comprising:
interfacing to at least one MNO gateway in order to service communication connections to mobile devices for use in carrying out the telecommunication function.

13. A method according to claim 1, further comprising:
in servicing a given electronic request, exchanging messages with a respective MNO gateway, the messages carrying information to the respective MNO gateway, such information identifying the social network application whose execution generated the given electronic request.

14. A method according to claim 13, wherein:
the information communicated to the respective MNO gateway further includes information pertaining to at least one other connection for servicing the telecommunication function identified by the given electronic request.

15. A method according to claim 14, wherein:
the information pertaining to at least one other connection is selected from the group including geographic information and information identifying another gateway for servicing the telecommunication function identified by the given electronic request.

16. A method according to claim 13, wherein:
the information communicated to the respective MNO gateway is used to generate electronic records pertaining to the servicing of the telecommunication function for the given electronic request by the respective MNO gateway.

17. A method according to claim 13, wherein:
the information communicated to the respective MNO gateway is used to selectively authorize the servicing of the telecommunication function for the given electronic request by the respective MNO gateway.

18. A method according to claim 1, further comprising:
generating service records pertaining to the telecommunication functions for a plurality of requests, the service records stored in the information repository;
wherein the user-profiles stored in the information repository include information derived from said service records.

19. A method according to claim 3, further comprising:
means for generating service records pertaining to the telecommunication functions for a plurality of requests, the service records stored in the information repository;
wherein the user-profiles stored in the information repository include information derived from said service records; and
wherein the developer information stored in the information repository includes information derived from said service records.

20. A method according to claim 3, further comprising:
means for generating service records pertaining to the telecommunication functions for a plurality of requests, the records stored in the information repository;
wherein the user-profiles stored in the information repository include information derived from said service records;
wherein the developer information stored in the information repository includes information derived from said service records; and
wherein the MNO information stored in the information repository includes information derived from said service records.

21. A method according to claim 1, further comprising:
providing access to the information stored in the information repository by social network users via data exchange over the World Wide Web.

22. A method according to claim 1, further comprising:
configuring a switch to bridge bearer traffic communicated to and from a communication device for a given social network user as part of the telecommunication function.

23. A method according to claim 1, wherein:
the telecommunication function provides for anonymous communication between particular social network users in a manner that does not expose the device identifier of the communication device for the respective social network users.

24. A method according to claim 1, further comprising:
registering a respective social network user, including communicating with the respective social network user to register a device identifier for association with a social network user identifier for the respective social network user and storing the social network user identifier and the associated device identifier in the information repository as part of the user-profile of the respective social network user.

25. A method according to claim 24, wherein:
the registering involves a communication loop to the communication device identified by the device identifier in order to verify possession of such communication device.

26. A method according to claim 25, wherein:
the communication loop involves a first SMS message sent to the communication device identified by the device identifier as well as second SMS message sent from the communication device identified by the device identifier to a predetermined short code.

27. A method according to claim 26, wherein:
the first SMS message includes an authentication code that is returned in the second SMS message.

28. A method according to claim 24, wherein:
the initiating of the telecommunication function with respect to a given social network user occurs only after the registering of the given social network user is successfully completed.

29. A method according to claim 24, further comprising:
initiating the registering of a given social network user in the event that said accessing fails to return a device identifier corresponding to the given social network user identifier included as part of the electronic request.

30. A method according to claim 24, wherein:
the social network application interfaces to a seperate and distinct social network service to authenticate the social network user of the social network application; and
the social network application issues the electronic request only after the social network user has been successfully authenticated by the interface to the social network service.

31. A method according to claim 24, wherein:
the initiating of the telecommunication function with respect to a given social network user is selectively performed according to the user-profile of the given social network user stored in the information repository.

32. A method according to claim 24, wherein:
the telecommunication function involves voice communication to and from a mobile device of at least one the second plurality of social network users; and
the method further comprises messaging to a gateway of at least one MNO network.

33. A method according to claim 32, wherein:
the messaging includes communication a message that is received and processed by the gateway of the MNO network for a call processing function specific to a social network user of the social network application.

34. A method according to claim 33, wherein:
the call processing function involves selectively authorizing a call to the mobile device for the social network user of the social network application.

35. A method according to claim 33, wherein:
the call processing function involves selectively terminating a call to the mobile device for the social network user of the social network application.

36. A method according to claim 33, wherein:
the call processing function involves billing a call as carried out by the mobile device for the social network user of the social network application.

37. A method according to claim 33, wherein:
the gateway of the MNO network services bearer traffic for the voice communication to and from the mobile device for the social network user.

38. A telecommunication system for servicing communication requests from social network users, comprising:
an information repository configured to electronically store a user-profile for each of a first plurality of social network users, said user-profile including at least one social network user identifier used by a social network to identify the social network user and at least one device identifier for a communication device of the social network user; and
a computer processing system including messaging interface, first logic, second logic and third logic;
wherein the first logic is configured to control access to data stored in the information repository by social network users;
wherein the messaging interface is configured to receive an electronic request to initiate a telecommunication function involving a second plurality of social network users, the electronic request being issued in conjunction with execution of a social network application by a social network user and identifying each one of the second plurality of social network users by their social network user identifier stored in their user-profile;
wherein the second logic is configured to access the information repository to query the user-profile for each one of the second plurality of social network users, wherein said accessing retrieves a device identifier for at least one of the second plurality of social network users identified in the electronic request by the social network user identifier stored in the respective user-profile; and
wherein the third logic is configured to initiate the electronically requested telecommunication function, including communication to devices of the second plurality of social network users corresponding to at least one device identifier retrieved from the information repository.

39. A telecommunication system according to claim 38, wherein:
said first logic is configured to allow access to user-profile for a particular social network user by the particular social network user while blocking access to the user-profile for the particular social network user by other social network users.

40. A telecommunication system according to claim 38, wherein:
said information repository further stores developer information corresponding to at least one social network application (SNA) developed and/or maintained by a respective SNA developer; and
said first logic is configured to provide controlled access to the developer information stored in the information repository by developer users associated with a respective SNA.

41. A telecommunication system according to claim 40, wherein:
said first logic is configured to allow access to the user-profile for a particular social network user by the particular social network user while blocking access to the user-profile for the particular social network user by select users including other social network users and all developer users; and said first logic is further configured to allow access to developer information pertaining to a particular SNA by developers associated with the particular SNA while blocking access to the developer information pertaining to the particular SNA by select users including developer users associated with other SNA developers and all social network users.

42. A telecommunication system according to claim 40, wherein:
said information repository further stores mobile network operator (MNO) information corresponding to a respective MNO; and
said first logic is configured to provide controlled access to the MNO information stored in the information repository by MNO users associated with a respective MNO.

43. A telecommunication system according to claim 42, wherein:
said first logic is configured to allow access to social network user information pertaining to a particular social network user by the particular social network user while blocking access to the social network user information pertaining to the particular social network user by select users including other social network users, all developer users and all MNO users;
said first logic is further configured to allow access to developer information pertaining to a particular SNA by developers associated with the particular SNA while blocking access to the developer information pertaining to the particular SNA by select users including developer users associated with other SNA developers, all social network users and all MNO users; and
said first logic is further configured to allow access to MNO information pertaining to a particular MNO by MNO users associated with the particular MNO while blocking access to the MNO information pertaining to the particular MNO by select users including MNO users associated with other MNOs, all social network users and all developer users.

44. A telecommunication system according to claim 38, wherein:
the telecommunication function involves voice communication amongst the second plurality of social network users, wherein the voice communication involves a plurality of communication connections to communication devices for the plurality of social networking users, at least one of the communication devices identified by corresponding device identifiers retrieved from the information repository by the second logic.

45. A telecommunication system according to claim 38, wherein:
the telecommunication function involves SMS communication from a sending social network user to at least one recipient social network user, wherein the SMS communication involves a communication connection to a communication device for a respective recipient social networking user, the communication device identified by corresponding device identifier retrieved from the information repository by the second logic.

46. A telecommunication system according to claim 38, wherein:
the device identifier for a given social network user as stored in the user-profile of the information repository comprises a phone number assigned to a particular mobile telephony device associated with the given social network user, the phone number stored in non-volatile memory of the particular mobile telephony device.

47. A telecommunication system according to claim 38, wherein:
the device identifier for a given social network user as stored in the user-profile of the information repository comprises a phone number assigned to a particular PSTN line associated with the given respective social network user.

48. A telecommunication system according to claim 38, wherein:
the device identifier for a given social network user as stored in the user-profile of the information repository comprises an IP address assigned to a particular communication device associated with the respective social network user.

49. A telecommunication system according to claim 38, further comprising:
a softswitch that is configured to interface to at least one MNO gateway in order to service communication connections to mobile devices for use in carrying out the telecommunication function.

50. A telecommunication system according to claim 49, wherein:
the softswitch is configured to exchange messages with a respective MNO gateway, the messages carrying information to the respective MNO gateway, such information identifying the social network application whose execution generated the given electronic request.

51. A telecommunication system according to claim 50, wherein:
the information communicated to the respective MNO gateway further includes information pertaining to at least one other connection for servicing the telecommunication function identified by the given electronic request.

52. A telecommunication system according to claim 51, wherein:
the information pertaining to at least one other connection is selected from the group including geographic information and information identifying another gateway for servicing the telecommunication function identified by the given electronic request.

53. A telecommunication system according to claim 50, wherein:
the information communicated to the respective MNO gateway is used to generate electronic records pertaining to the servicing of the telecommunication function for the given electronic request by the respective MNO gateway.

54. A telecommunication system according to claim 50, wherein:
the information communicated to the respective MNO gateway is used to selectively authorize the servicing of the telecommunication function for the given electronic request by the respective MNO gateway.

55. A telecommunication system according to claim 38, wherein:
the computer processing system further includes fourth logic configured to generate service records pertaining to the telecommunication functions initiated by the telecommunication system, the service records stored in the information repository;
wherein the user-profiles stored in the information repository include information derived from said service records.

56. A telecommunication system according to claim 38, wherein:
said first logic is configured to provide access to the information stored in the information repository by social network users via data exchange over the World Wide Web.

57. A telecommunication system according to claim 40, wherein:
the computer processing system further includes fourth logic configured to generate service records pertaining to the telecommunication functions initiated by the telecommunication service, the service records stored in the information repository;
wherein the user-profiles stored in the information repository includes information derived from said service records; and
wherein the developer information stored in the information repository includes information derived from said service records.

58. A telecommunication system according to claim 40, wherein:
said first logic provides access to the information stored in the information repository by social network users and SNA developer users via data exchange over the World Wide Web.

59. A telecommunication system according to claim 42, wherein:
the computer processing system further includes fourth logic configured to generate service records pertaining to the telecommunication functions initiated by the telecommunication service, the service records stored in the information repository;
wherein the user-profiles stored in the information repository includes information derived from said service records;
wherein the developer information stored in the information repository includes information derived from said service records; and
wherein the MNO information stored in the information repository includes information derived from said service records.

60. A telecommunication system according to claim 42, wherein:
said first logic is configured to provide access to the information stored in the information repository by social network users and SNA developer users and MNO users via data exchange over the World Wide Web.

61. A telecommunication system according to claim 38, further comprising:
a softswitch configured to bridge bearer traffic communicated to and from a communication device for a given social networking user as part of the telecommunication function.

62. A telecommunication system according to claim 38, wherein:
the telecommunication function provides for anonymous communication between social network users in a manner that does not expose the device identifier for the communication device for the respective social networking users.

63. A telecommunication system according to claim 38, wherein:
the computer processing system further includes user registration logic configured to register a respective social network user, including initiating communication with the respective social network user to register a device identifier for association with a social network user identifier for the respective social network user and storing the social network user identifier and the associated device identifier in the information repository as part of the user-profile of the respective social network user.

64. A telecommunication system according to claim 63, wherein:
the user registration logic is further configured to perform a communication loop to the communication device identified by the device identifier in order to verify possession of such communication device.

65. A telecommunication system according to claim 64, wherein:
the communication loop involves a first SMS message sent to the communication device identified by the device identifier as well as second SMS message sent from the communication device identified by the device identifier to a predetermined short code.

66. A telecommunication system according to claim 65, wherein:
the first SMS message includes an authentication code that is returned in the second SMS message.

67. A telecommunication system according to claim 63, wherein:
the third logic is further configured to initiate the telecommunication function with respect to a given social network user only after the registration of the given social network user is successfully completed by the user registration logic.

68. A telecommunication system according to claim 63, wherein:
the user registration logic is further configured to initiate the registering of a given social network user in the event that the accessing of the third logic fails to return a device identifier corresponding to the given social network user identifier included as part of the electronic request.

69. A telecommunication system according to claim 63, wherein:
the social network application is configured to interface to a seperate and distinct social network service to authenticate the social network user of the social network application; and
the social network application is further configured to issue the electronic request only after the social network user has been successfully authenticated by the interface to the social network service.

70. A telecommunication system according to claim 38, wherein:
the third logic is further configured to selectively initiate the telecommunication function with respect to a given social network user according to the user-profile of the given social network user stored in the information repository.

71. A telecommunication system according to claim 38, wherein:
the telecommunication function involves voice communication to and from a mobile device of at least one the second plurality of social network users; and
the system further comprises messaging logic configured to exchange messages with a gateway of at least one MNO network.

72. A telecommunication system according to claim 71, wherein:
the messages include a message that is received and processed by the gateway of the MNO network for a call processing function specific to a social network user of the social network application.

73. A telecommunication system according to claim 72, wherein:
the call processing function involves selectively authorizing a call to the mobile device for the social network user of the social network application.

74. A telecommunication system according to claim 72, wherein:
the call processing function involves selectively terminating a call to the mobile device for the social network user of the social network application.

75. A telecommunication system according to claim 72, wherein:
the call processing function involves billing a call as carried out by the mobile device for the social network user of the social network application.

76. A telecommunication system according to claim 72, wherein:
the gateway of the MNO network services bearer traffic for the voice communication to and from the mobile device for the social network user.

77. A telecommunication system for servicing communication requests from social network users, comprising:
an information repository configured to electronically store a user-profile for each of a first plurality of social network users, said user-profile including at least one social network user identifier used by a social network to identify the social network user and at least one device identifier for a communication device of the social network user, means for controlling access to data stored in the information repository by social network users;

a messaging interface configured to receive an electronic request to initiate a telecommunication function involving a second plurality of social network users, the electronic request being issued in conjunction with execution of a social network application by a social network user and identifying each one of the second plurality of social network users by their social network user identifier stored in their user-profile;

means for accessing the information repository to query the user-profile for each one of the second plurality of social network users, wherein said accessing retrieves a device identifier for at least one of the second plurality of social network users identified in the electronic request by the social network user identifier stored in the respective user-profile; and means for initiating the electronically requested telecommunication function, including communication to devices of the second plurality of social network users corresponding to at least one device identifier retrieved from the information repository.

* * * * *